US012635019B2

(12) United States Patent
Faccin et al.

(10) Patent No.: US 12,635,019 B2
(45) Date of Patent: May 19, 2026

(54) MECHANISM TO ENABLE INTERWORKING BETWEEN NETWORK SLICING AND EVOLVED PACKET CORE CONNECTIVITY

(71) Applicant: QUALCOMM Incorporated, San Diego, CA (US)

(72) Inventors: Stefano Faccin, San Ysidro, CA (US); Haris Zisimopoulos, London (GB); Sebastian Speicher, Wallisellen (CH)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/535,729

(22) Filed: Dec. 11, 2023

(65) Prior Publication Data

US 2024/0107383 A1    Mar. 28, 2024

Related U.S. Application Data

(60) Division of application No. 17/313,585, filed on May 6, 2021, now Pat. No. 11,877,192, which is a
(Continued)

(51) Int. Cl.
*H04W 76/16*        (2018.01)
*H04W 8/02*         (2009.01)
(Continued)

(52) U.S. Cl.
CPC ............. *H04W 76/16* (2018.02); *H04W 8/02* (2013.01); *H04W 16/04* (2013.01);
(Continued)

(58) Field of Classification Search
CPC ....... H04W 76/16; H04W 36/13; H04W 8/02; H04W 16/04; H04W 36/0022;
(Continued)

(56) References Cited

U.S. PATENT DOCUMENTS

| 11,026,128 B2 | 6/2021 | Faccin et al. |
| 2017/0289265 A1 | 10/2017 | Faccin et al. |

(Continued)

FOREIGN PATENT DOCUMENTS

| CN | 107071799 A | 8/2017 |
| CN | 107197486 A | 9/2017 |

(Continued)

OTHER PUBLICATIONS

U.S. Appl. No. 62/521,384, Specification,Dec. 17, 2019 (Year: 2019).*

(Continued)

*Primary Examiner* — Sujoy K Kundu
*Assistant Examiner* — Weibin Huang
(74) *Attorney, Agent, or Firm* — ArentFox Schiff, LLP

(57)                ABSTRACT

Aspects of the present disclosure relate to a mechanism to enable interworking between fifth generation system (5GS) network slicing and evolved packet core (EPC) connectivity. In an example, techniques are provided for existing packet data unit (PDU) sessions that provide connectivity to a network slice from a set of network slices. Connectivity to the network slice is in response to a user equipment (UE), that uses network slices, moving between a 5G network and a 4G network. The existing PDU sessions are connected to a dedicated EPC core network that supports the same services provided by the network slice.

4 Claims, 9 Drawing Sheets

300

Related U.S. Application Data continuation of application No. 16/117,738, filed on Aug. 30, 2018, now Pat. No. 11,026,128.

(60) Provisional application No. 62/574,615, filed on Oct. 19, 2017.

(51) Int. Cl.

| | |
|---|---|
| *H04W 16/04* | (2009.01) |
| *H04W 36/00* | (2009.01) |
| *H04W 48/18* | (2009.01) |
| *H04W 60/00* | (2009.01) |
| *H04W 84/00* | (2009.01) |
| *H04W 48/16* | (2009.01) |

(52) U.S. Cl.
CPC ... *H04W 36/0022* (2013.01); *H04W 36/0027* (2013.01); *H04W 36/0066* (2013.01); *H04W 36/13* (2023.05); *H04W 48/18* (2013.01); *H04W 60/00* (2013.01); *H04W 84/00* (2013.01); *H04W 48/16* (2013.01)

(58) Field of Classification Search
CPC ......... H04W 36/0027; H04W 36/0066; H04W 48/18; H04W 60/00; H04W 84/00; H04W 48/16
See application file for complete search history.

(56) References Cited

U.S. PATENT DOCUMENTS

| | | | | |
|---|---|---|---|---|
| 2018/0220256 | A1 | 8/2018 | Kotecha et al. | |
| 2019/0029065 | A1* | 1/2019 | Park | H04W 60/00 |
| 2019/0116526 | A1* | 4/2019 | Tiwari | H04W 76/27 |
| 2019/0124561 | A1 | 4/2019 | Faccin et al. | |
| 2019/0208573 | A1 | 7/2019 | Yang et al. | |
| 2019/0364541 | A1* | 11/2019 | Ryu | H04W 80/10 |
| 2020/0053531 | A1* | 2/2020 | Myhre | H04W 48/18 |
| 2020/0120589 | A1 | 4/2020 | Velev et al. | |
| 2020/0178343 | A1* | 6/2020 | Kim | H04W 76/27 |
| 2020/0187106 | A1* | 6/2020 | Salkintzis | H04W 4/60 |
| 2020/0245127 | A1* | 7/2020 | Zong | H04W 36/0066 |
| 2021/0258836 | A1 | 8/2021 | Faccin et al. | |

FOREIGN PATENT DOCUMENTS

| | | |
|---|---|---|
| TW | 201728221 A | 8/2017 |
| WO | 2017143047 A1 | 8/2017 |

OTHER PUBLICATIONS

European Search Report—EP24162367—Search Authority—Munich—Jul. 3, 2024.

Qualcomm Incorporated, et al., "IFOM support PCO definition", 3GPP TSG-CT WG1 Meeting #68, C1-104670, 3rd Generation Partnership Project, Mobile Competence Centre, 650, Route Des Lucioles, F-06921, Sophia-Antipolis Cedex, France, vol. CT WG1, No. Jacksonville, Nov. 15, 2010, Nov. 7, 2010, 8 Pages, XP050478894.

Huawei, et al., "TS 23.501: Description of DNN", 3GPP TSG SA WG2 #122, S2-174440 (revision of S2-173197), Jun. 26-30, 2017, Cabo, Mexico, 4 Pages, Jun. 20, 2017.

International Preliminary Report on Patentability—PCT/US2018/049137, The International Bureau of WIPO—Geneva, Switzerland, Apr. 30, 2020.

International Search Report and Written Opinion—PCT/US2018/049137—ISA/EPO—Jan. 22, 2019.

NTT Docomo: "23.501: OI 4b—Network slicing and Interworking with EPS", S2-177226, SA WG2 Meeting 123, Oct. 23 to 27, 2017, Ljubljana, Slovenia (Document available Date: Oct. 17, 2017), 4 Pages, Entirety.

NTT Docomo, et al., "23.501: Resolving EN for SM and SMF/UPF Selection Related to Network Slicing Aspect", 3GPP TSG SA WG2 #122BIS, S2-176386, Aug. 21-25, 2017, Sophia Antipolis, France, 5 Pages, Aug. 29, 2017.

NTT Docomo: "TS 23.503: OI#8a: Pre-Configuration of Mapping Between Application and S-NSSAI", 3GPP Draft, S2-177227 TS 23.503-SliceMappingPreconfigured, 3rd Generation Partnership Project (3GPP), Mobile Competence Centre, 650, Route Des Lucioles, F-06921 Sophia-Antipolis Cedex, France vol. SA WG2. No. Ljubljana, Slovenia, Oct. 23, 2017-Oct. 27, 2017, Oct. 17, 2017 (Oct. 17, 2017), XP051359896, pp. 1-3.

Partial International Search Report—PCT/US2018/049137—ISA/EPO—Nov. 29, 2018.

Qualcomm Incorporated: "TS 23.501: Applicability of UE Slicing Configuration in Roaming Scenarios", 3GPP Draft, S2-176949 TS 23.501 Nssproamingmergeies VI, 3rd Generation Partnership Project (3GPP), Mobile Competence Centre, 650, Route Des Lucioles, F-06921 Sophia-Antipolis Cedex, France, vol. SA WG2. No. Ljubljana. Slovenia, Oct. 23, 2017-Oct. 27, 2017, Oct. 17, 2017 (Oct. 17, 2017), XP051359654, 10 Pages.

Qualcomm Incorporated: "TS 23.501: Slicing Support for the 5GS UE", SA WG2 Meeting #S2-123, S2-176948, Oct. 23-27, 2017, Ljubljana, Slovenia, pp. 1-11, Oct. 17, 2017, the whole document.

Taiwan Search Report—TW107130542—TIPO—Oct. 11, 2021.

* cited by examiner

300

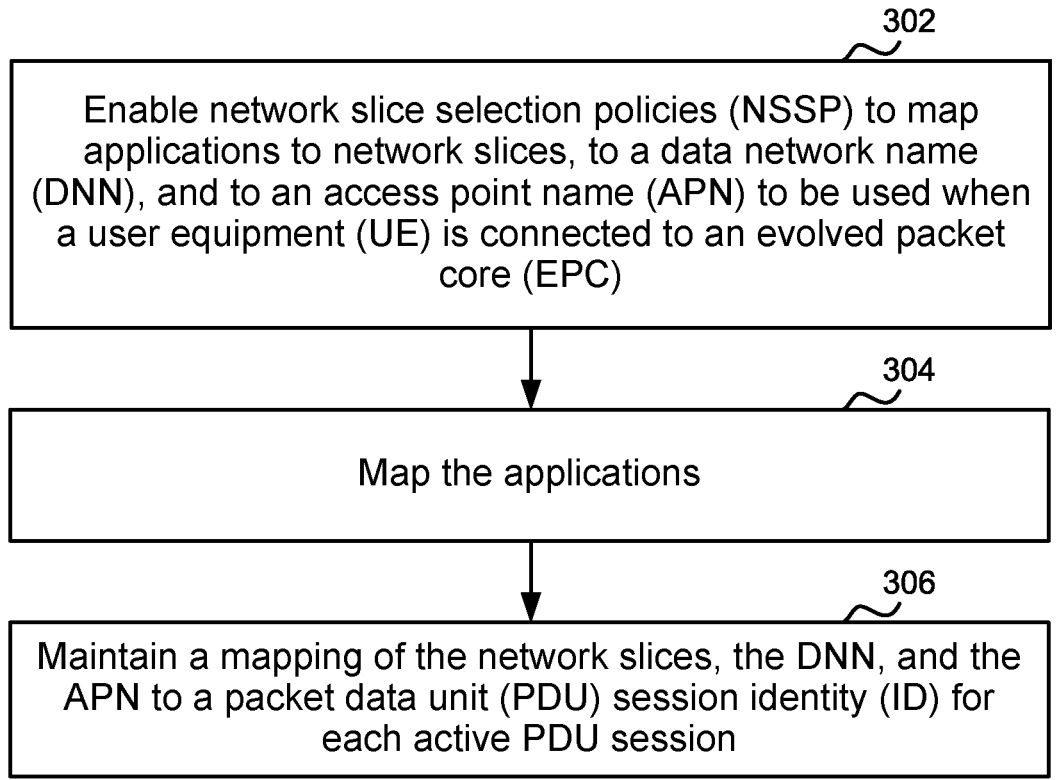

302

Enable network slice selection policies (NSSP) to map applications to network slices, to a data network name (DNN), and to an access point name (APN) to be used when a user equipment (UE) is connected to an evolved packet core (EPC)

304

Map the applications

306

Maintain a mapping of the network slices, the DNN, and the APN to a packet data unit (PDU) session identity (ID) for each active PDU session

Figure 4:
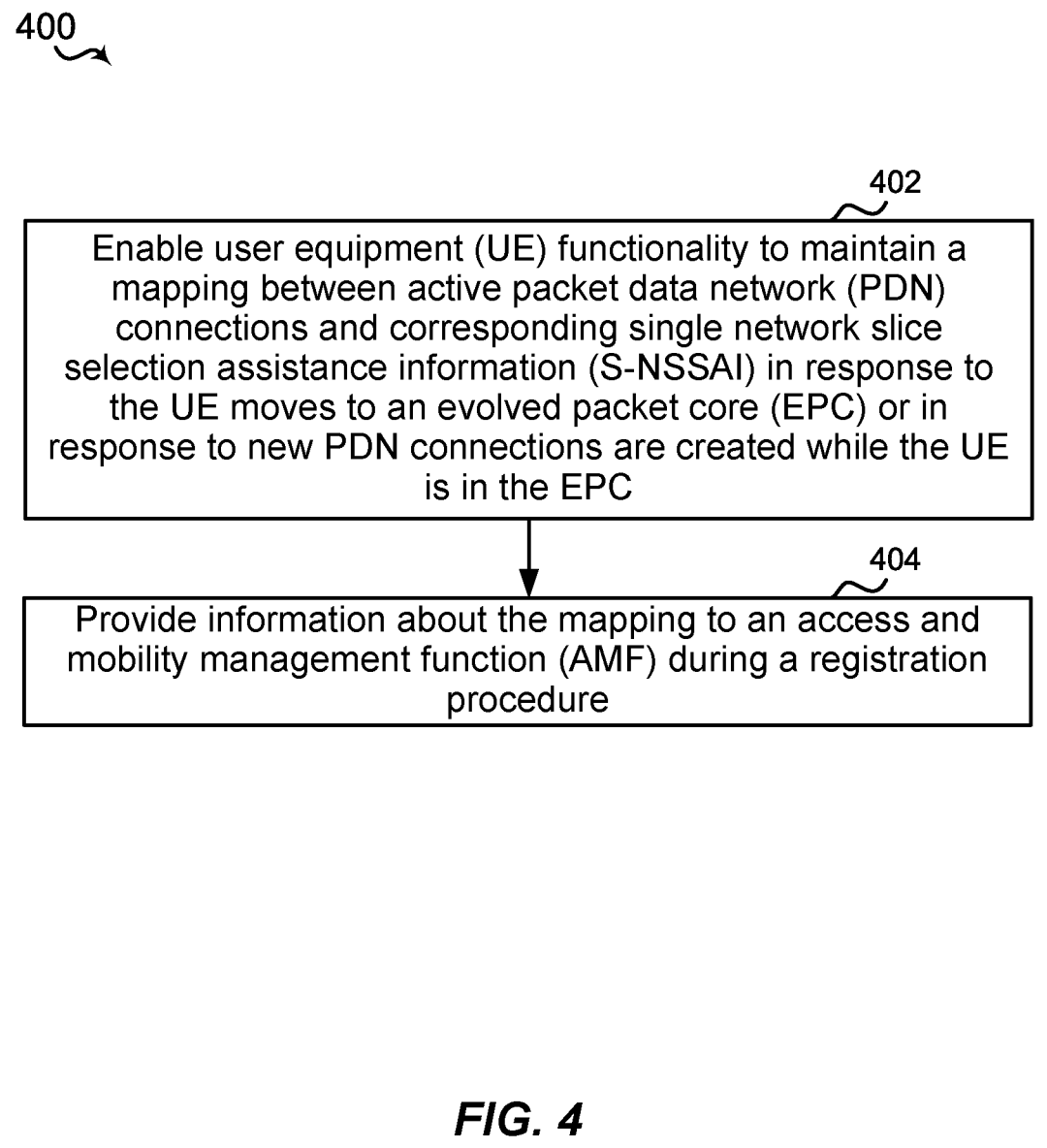

Enable user equipment (UE) functionality to maintain a mapping between active packet data network (PDN) connections and corresponding single network slice selection assistance information (S-NSSAI) in response to the UE moves to an evolved packet core (EPC) or in response to new PDN connections are created while the UE is in the EPC

404

Provide information about the mapping to an access and mobility management function (AMF) during a registration procedure

Enable an access and mobility management function (AMF) supporting a connectivity to a variety of network slices to be configured with a mapping between a set of network slices in an list of network slices allowed by the network for the UE to a specific dedicated core network (DCN) in an evolved packet core (EPC)

504

Apply the mapping

600

602

Enable a session management function (SMF)-selection functionality to ensure that an access and mobility management function (AMF) selects an SMF for establishing a packet data unit (PDU) session for a user equipment (UE) corresponding to a network slice considering a mapping between a set of network slices and dedicated core networks (DCNs) in the evolved packet core (EPC)

604

Apply the SMF-selection functionality

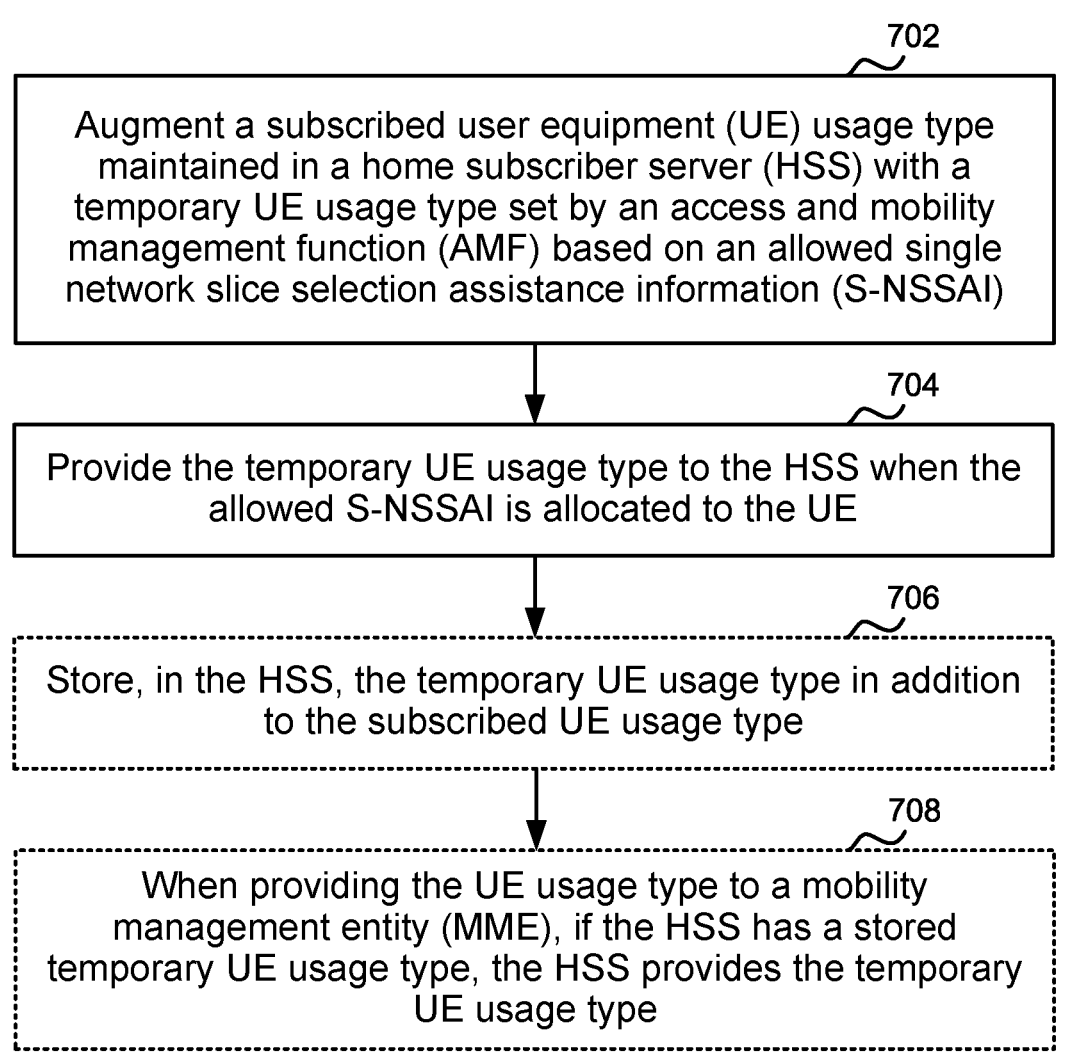

702

Augment a subscribed user equipment (UE) usage type maintained in a home subscriber server (HSS) with a temporary UE usage type set by an access and mobility management function (AMF) based on an allowed single network slice selection assistance information (S-NSSAI)

704

Provide the temporary UE usage type to the HSS when the allowed S-NSSAI is allocated to the UE

706

Store, in the HSS, the temporary UE usage type in addition to the subscribed UE usage type

708

When providing the UE usage type to a mobility management entity (MME), if the HSS has a stored temporary UE usage type, the HSS provides the temporary UE usage type

*FIG. 7*

MECHANISM TO ENABLE INTERWORKING BETWEEN NETWORK SLICING AND EVOLVED PACKET CORE CONNECTIVITY

CROSS-REFERENCE TO RELATED APPLICATION(S)

This application is a divisional of U.S. application Ser. No. 17/313,585, entitled "MECHANISM TO ENABLE INTERWORKING BETWEEN NETWORK SLICING AND EVOLVED PACKET CORE CONNECTIVITY," and filed May 6, 2021, which is a continuation of U.S. application Ser. No. 16/117,738, entitled "A MECHANISM TO ENABLE INTERWORKING BETWEEN NETWORK SLICING AND EVOLVED PACKET CORE CONNEC-TIVITY", and filed on Aug. 30, 2018, which claims the benefit of U.S. Provisional Application No. 62/574,615, entitled "A MECHANISM TO ENABLE INTERWORK-ING BETWEEN 5GS NETWORK SLICING AND EPC CONNECTIVITY", and filed on Oct. 19, 2017, the disclo-sures of which are expressly incorporated by reference herein in their entireties.

BACKGROUND

Aspects of the present disclosure relate generally to wireless communication networks, and more particularly, to a mechanism to enable interworking between fifth genera-tion system (5GS) network slicing and evolved packet core (EPC) connectivity.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-divi-sion multiple access (TDMA) systems, frequency-division multiple access (FDMA) systems, orthogonal frequency-division multiple access (OFDMA) systems, and single-carrier frequency division multiple access (SC-FDMA) sys-tems.

These multiple access technologies have been adopted in various telecommunication standards to provide a common protocol that enables different wireless devices to commu-nicate on a municipal, national, regional, and even global level. For example, a fifth generation (5G) wireless com-munications technology (which can be referred to as new radio (NR)) is envisaged to expand and support diverse usage scenarios and applications with respect to current mobile network generations. In an aspect, 5G communica-tions technology can include: enhanced mobile broadband addressing human-centric use cases for access to multimedia content, services and data; ultra-reliable-low latency com-munications (URLLC) with certain specifications for latency and reliability; and massive machine type commu-nications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current interworking between 5GS network slicing and EPC (e.g., support for fourth generation (4G) wireless communications technology) connectivity solutions may not be supported or provide a desired level of speed or customi-zation for efficient operation. Thus, improvements in wire-less communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. The sole purpose of this summary is to present some concepts of one or more aspects in a simplified form as a prelude to the more detailed description that is presented later.

In an aspect, the present disclosure includes techniques or mechanisms to enable interworking between 5GS network slicing and EPC (e.g., support for 4G) connectivity such that, for example, existing packet data unit (PDU) sessions are maintained and not dropped when a user equipment (UE) that uses network slices moves between a 5G network and a 4G network. In another aspect, the present disclosure includes techniques or mechanisms to enable interworking between 5GS network slicing and EPC (e.g., support for 4G) connectivity such that, for example, existing PDU sessions that provide connectivity to a network slice when a UE that uses network slices moves between a 5G network and a 4G network are connected to a dedicated EPC core network that supports the same services provided by the network slice.

In another aspect, a method of wireless communications is described that includes enabling Network Slice Selection Policies (NSSP) to map applications to network slices, to a data network name (DNN), and to an access point name (APN) to be used when a UE is connected to an EPC, as an example when the APN used in the EPC is different from the DNN used in a 5G network; and mapping the applications.

In another aspect, a method of wireless communications is described that includes enabling UE functionality to maintain a mapping between active packet data network (PDN) connections and corresponding single network slice selection assistance information (S-NSSAI) in response to the UE moving to an EPC or in response to new PDN connections being created while the UE is in the EPC; and providing information about the mapping to an access and mobility management function (AMF) during a registration procedure.

In yet another aspect, a method of wireless communica-tions is described that includes enabling an AMF supporting a connectivity to a variety of network slices to be configured with a mapping between a set of network slices (e.g. each identified by a S-NSSAI) in a list of network slices allowed by the network for the UE (i.e. in an allowed S-NSSAI assigned to UE) to a specific dedicated core network (DCN) in an EPC; and applying the mapping.

In another aspect, a method of wireless communications is described that includes enabling a session management function (SMF)-selection functionality to ensure that an AMF selects the SMF for establishing a PDU session for a UE corresponding to a network slice (e.g. identified by an S-NSSAI) considering a mapping between a set of network slices (e.g. each identified by the S-NSSAI) and DCNs in the EPC, in order to ensure the SMF may continue supporting the connectivity management for the PDU session when the UE moves the PDU session to the EPC and a specific DCN is selected to serve the UE based on the mapping between the network slices and the DCNs; and applying the SMF-selection functionality.

In another aspect, a method of wireless communications is described that includes augmenting a subscribed UE usage type maintained in a home subscriber server (HSS) with a temporary UE usage type set by an AMF based on an allowed S-NSSAI; providing the temporary UE usage type to the HSS when the allowed S-NSSAI is allocated to the UE; storing, in the HSS, the temporary UE usage type in addition to the subscribed UE usage type; and, when providing the UE usage type to a mobility management entity (MME), if the HSS has a stored temporary UE usage type, the HSS provides the temporary UE usage type.

In another aspect, a wireless communication device is described that includes a transceiver, a memory, and a processor in communication with the memory and the transceiver, wherein the processor is configured to perform any of the methods described herein.

In yet another aspect, a wireless communication device is described that includes one or more means for performing any of the methods described herein.

In yet another aspect, a computer-readable medium storing computer code executable by a processor for wireless communications is described that includes one or more codes executable to perform any of the methods described herein.

Moreover, the present disclosure also includes apparatus having components or configured to execute or means for executing the above-described methods, and computer-readable medium storing one or more codes executable by a processor to perform the above-described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 3 is a flow diagram of an example of a method for interworking between 5GS network slicing and EPC connectivity;

FIG. 4 is a flow diagram of an example of another method for interworking between 5GS network slicing and EPC connectivity;

FIG. 6 is a flow diagram of an example of another method for interworking between 5GS network slicing and EPC connectivity;

FIG. 7 is a flow diagram of an example of yet another method for interworking between 5GS network slicing and EPC connectivity;

DETAILED DESCRIPTION

Figure 1:
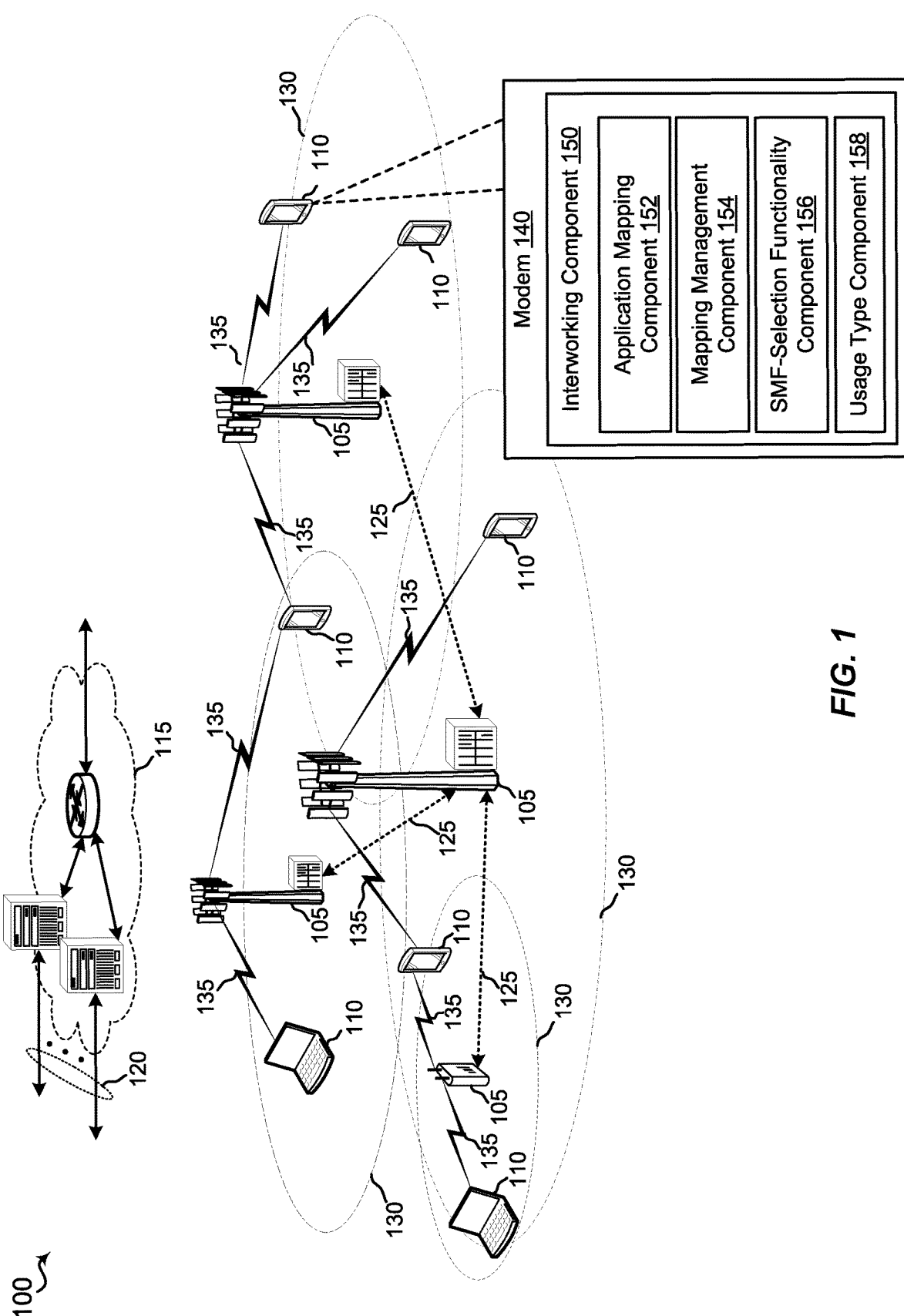
FIG. 1 is a schematic diagram of a wireless communication network including at least one user equipment (UE) having an interworking component configured according to this disclosure to interworking between fifth generation system (5GS) network slicing and evolved packet core (EPC) connectivity.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to a techniques or mechanisms to enable interworking between fifth generation system (5GS) network slicing and evolved packet core (EPC) (e.g., support for fourth generation (4G)) connectivity such that, for example, existing packet data unit (PDU) sessions are maintained and not dropped when a user equipment (UE) that uses network slices moves between a 5G network and a 4G network. In another aspect, the present disclosure includes techniques or mechanisms to enable interworking between 5GS network slicing and EPC (e.g., support for 4G) connectivity such that, for example, existing PDU sessions that provide connectivity to a network slice when a UE that uses network slices moves between a 5G network and a 4G network and are connected to a dedicated EPC core network that supports the same services provided by the network slice.

With the introduction of the complex feature of slicing in 5G networks, interworking with the EPC for devices in networks without full 5G radio access network (RAN) coverage or where some services are available only in the EPC must consider how the functionality of slicing in the 5GC will interwork when the EPC: (1) supports no dedicated core network concept, (2) supports Dedicated Core Networks (DCNs) via Decor, (3) supports DCNs via eDecor (i.e., UE-assisted Decor). In particular, solutions are needed to: (1) define how a set of allowed network slices in the 5G core network (5GC) for a UE is mapped on one DCN when the UE moves to the EPC, or how they are handled when the UE moves to an EPC without DCNs, (2) define how sets that can co-exist in the 5GC but map to different DCNs are handled in mobility to the EPC, and (3) define how connectivity to the EPC is mapped to network slices when the UE moves from the EPC to the 5GC, since the EPC has no concept of network slices and no network slicing context can be maintained or supported by EPC network functions.

The solutions described herein for the issues noted above introduce various components or aspects:

(1) Enhance network slice selection policies (NSSP) to map not only applications to network slices (e.g., single network slice selection assistance information (S-NS-SAI)) and to a data network name (DNN), but also to the access point name (APN) to be used when the UE is in the EPC;

(2) Enhance the UE functionality to maintain the mapping between active packet data network (PDN) connections and the corresponding S-NSSAI when the UE moves to the EPC or when new PDN connections are created while the UE is in the EPC. The UE will use such information when moving from EPC to 5GC and will provide it to the access and mobility management function (AMF) during a routing management (RM) procedure (e.g., registration procedure).

(3) Enhance the AMF to be configured with a mapping between a set of S-NSSAIs in the allowed S-NSSAI assigned to a UE to a DCN in the EPC.

(4) Enhance session management function (SMF)-selection functionality to ensure that the AMF selects an SMF considering the mapping between S-NSSAIs and DCNs.

(5) Ensure the UE Usage Type maintained in the home subscriber server (HSS) is augmented with a Temporary UE Usage Type set by the AMF based on the allowed NSSAI, and pushed to the HSS when an allowed NSSAI is allocated to the UE. When a mobility management entity (MME) asks the UE Usage Type from the HSS, if the Temporary UE Usage Type is set, the HSS provides such value. In this way the MME can select the DCN serving the UE based on dynamic information and not just subscription information.

Additional features of the present aspects are described in more detail below with respect to FIGS. 1-9.

It should be noted that the techniques described herein may be used for various wireless communication networks such as code-division multiple access (CDMA), time-division multiple access (TDMA), frequency-division multiple access (FDMA), orthogonal frequency-division multiple access (OFDMA), single-carrier frequency-division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having an interworking component 150 configured to support mechanisms to enable interworking between 5GS network slicing and EPC connectivity. In some aspects, the interworking component 150 may include one or more sub components including an application mapping component 152, a mapping management component 154, SMF-selection functionality component 156, and/or a usage type component 158. In an example, the application mapping component 152 is configured to enable NSSP to map applications to network slices, to a DNN, and to an APN to be used when a UE is connected to an EPC, and mapping the applications. In an example, the mapping management component 154 is configured to enable UE functionality to maintain a mapping between active PDN connections and corresponding S-NSSAI in response to the UE moving to an EPC or in response to new PDN connections being created while the UE is in the EPC, and provide information about the mapping to an AMF during a registration procedure. In another example, the mapping management component 154 is configured to enable an access and mobility management function (AMF) supporting a connectivity to a variety of network slices to be configured with a mapping between a set of network slices in an list of network slices allowed by the network for the UE to a specific dedicated core network (DCN) in an evolved packet core (EPC), apply the mapping.

In another example, the SMF-selection functionality component 156 is configured to enable a session management function (SMF)-selection functionality to ensure that an access and mobility management function (AMF) selects an SMF for establishing a packet data unit (PDU) session for a user equipment (UE) corresponding to a network slice considering a mapping between a set of network slices and dedicated core networks (DCNs) in an evolved packet core (EPC), and apply the SMF-selection functionality.

In another example, the usage type component 158 augment a subscribed user equipment (UE) usage type maintained in a home subscriber server (HSS) with a temporary UE usage type set by an access and mobility management function (AMF) based on an allowed single network slice selection assistance information (S-NSSAI), and provide the temporary UE usage type to the HSS when the allowed S-NSSAI is allocated to the UE.

Further, wireless communication network 100 includes at least one network device (see e.g., FIG. 9) an interworking component 950 (not shown) that performs network-related operations to support interworking between 5GS network slicing and EPC connectivity.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, the base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), 4G/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, an LTE, LTE-A or MuLTEfire technology, a Wi-Fi technology, a Bluetooth technology, or any other long or short range wireless communication technology. In LTE/LTE-A/MuLTEfire networks, the term evolved node B (eNB or e Node B) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

The UE 110 may be configured to establish one or more wireless communication links 135 with one or more of the base stations 105. The wireless communication links 135 shown in wireless communication network 100 may carry uplink (UL) transmissions from a UE 110 to a base station 105, or downlink (DL) transmissions, from a base station 105 to a UE 110. The DL transmissions may also be called forward link transmissions while the UL transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, the base stations 105 or the UEs 110 may include multiple antennas for employing antenna diversity schemes to improve communication quality and reliability between the base stations 105 and the UEs 110. Additionally or alternatively, the base stations 105 or the UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. CA may be used with both FDD and TDD component carriers. The base stations 105 and the UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The CCs may include a primary CC and one or more secondary CC. A primary CC may be referred to as a primary cell (PCell) and a secondary CC may be referred to as a secondary cell (SCell).

The wireless communications network 100 may further include the base stations 105 operating according to Wi-Fi technology, e.g., Wi-Fi access points, in communication with the UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of the base stations 105 and/or the UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, the base stations 105 and/or the UEs 110 operating according to the mmW technology may utilize beamforming in their transmissions to compensate for the extremely high path loss and short range.

Additional details related to the various aspects of techniques or mechanisms to enable interworking between 5GS network slicing and EPC (e.g., support for 4G) connectivity are described below.

DCN in EPC

For 4G systems, EPC supports dedicated core networks or DECOR. This feature enables an operator to deploy multiple DCNs within a public land mobile network (PLMN) with each DCN consisting of one or multiple core network (CN) nodes. Each DCN may be dedicated to serve specific type(s) of subscriber. This is an optional feature and enables DCNs to be deployed for one or multiple radio access technologies (RATs) (e.g., Global System for Mobile communications (GSM) Enhanced Data rates for GSM Evolution (EDGE) Radio Access Network (GERAN), Universal Terrestrial Radio Access Network (UTRAN), evolved UTRAN (E-UTRAN), Wideband E-UTRAN (WB-E-UTRAN) and Narrow Band Internet-of-Things (NB-IoT)). There can be several motivations for deploying DCNs, e.g., to provide DCNs with specific characteristics/functions or scaling, to isolate specific UEs or subscribers (e.g., machine-to-machine (M2M) subscribers, subscribers belonging to a specific enterprise or separate administrative domain, etc.). It is to be understood that a UE generally is connected to only one DCN at a time.

A DCN comprises one or more MME/serving General Packet Radio Service (GPRS) support node (SGSN) and it may comprise of one or more serving gateway (SGW)/PDN gateway (PGW)/policy and changing rules function (PCRF). This feature enables subscribers to be allocated to and served by a DCN based on subscription information ("UE Usage Type"). This feature handles both DCN selections without any specific UE functionality, that is, it works also with UEs of earlier releases and UE assisted DCN selection. The main specific functions are for routing and maintaining UEs in their respective DCN. The following deployment scenarios are supported for DCN. In some deployment scenarios, DCNs may be deployed to support one RAT only, (e.g., only dedicated MMEs are deployed to support E-UTRAN and dedicated SGSNs are not deployed), to support multiple RATs, or to support all RATs.

In some deployment scenarios, networks deploying DCNs may have a default DCN, which is managing UEs for which a DCN is not available or if sufficient information is not available to assign a UE to a DCN. One or multiple DCNs may be deployed together with a default DCN that all share the same RAN.

In some deployment scenarios, the architecture supports scenarios where the DCN is only deployed in a part of the PLMN (e.g. only for one RAT or only in a part of the PLMN area). Such heterogeneous or partial deployment of DCNs may, depending on operator deployment and configuration, result in service with different characteristics or functionality, depending on whether the UE is inside or outside the service area or RAT that supports the DCN. In some examples, heterogeneous or partial deployment of DCNs may result in increased occurrence of UEs first being served by a CN node in the default DCN and then being redirected to a CN node in the DCN that serves the UE when the UE moves from areas outside of DCN coverage to an area of DCN coverage. It may also result in an increased re-attach rate in the network. As this has impacts on the required capacity of the default CN nodes deployed at edge of DCN coverage, it is not recommended to deploy DCNs heterogeneously or partially.

In some deployment scenarios, even if the DCN is not deployed to serve a particular RAT or service area of PLMN, the UE in that RAT or service area may still be served by a PGW from the DCN.

A high level overview for supporting DCNs is provided below. In some examples, an optional subscription information parameter ("UE Usage Type") is used in the selection of a DCN. An operator configures which of his DCN(s) serves which UE Usage Type(s). The HSS provides the "UE Usage Type" value in the subscription information of the UE to the MME/SGSN. Both standardized and operator specific values for UE Usage Type are possible.

In some examples, the serving network selects the DCN based on the operator configured (UE Usage Type to DCN) mapping, other locally configured operator's policies and the UE related context information available at the serving network (e.g. information about roaming) UEs with different UE Usage Type values may be served by the same DCN. Moreover, UEs that share the same UE Usage Type value may be served by different DCNs.

In some examples, if the configuration shows no DCN for the specific "UE Usage Type" value in the subscription information, then the serving MME/SGSN serves the UE by the default DCN or selects a DCN using serving operator specific policies.

In some examples, the "UE Usage Type" is associated with the UE (describing its usage characteristic), that is, there is only one "UE Usage Type" per UE subscription.

In some examples, for each DCN, one or more CN nodes may be configured as part of a pool.

In some examples, for MME, the MME Group Identification(s) (ID(s)) or MMEGI(s) identifies a DCN within the PLMN. For SGSNs, a group identifier(s) identifies a DCN within the PLMN. That is, the group of SGSNs that belong to a DCN within a PLMN. This identifier may have the same format as Network Resource Identifier (NRI) (e.g. an NRI value that does not identify a specific SGSN node in the serving area) in which case it is called "Null-NRI" or it may have a format independent of NRI, in which case it is called "SGSN Group ID". The "Null-NRI" or "SGSN Group ID" is provided by an SGSN to RAN which triggers a Network Node Selection Function (NNSF) procedure to select an SGSN from the group of SGSNs corresponding to the Null-NRI/SGSN Group ID.

In some examples, SGSN Group IDs enable handling deployment scenarios where in a service area all NRI values are allocated to SGSNs and hence no NRI value remains that can be used as Null-NRI.

In some examples, the dedicated MME/SGSN that serves the UE selects a dedicated S-GW and P-GW based on UE Usage Type.

In some examples, at initial access to the network if sufficient information is not available for RAN to select a specific DCN, the RAN may selects a CN node from the default DCN. A redirection to another DCN may then be required.

In some examples, to redirect a UE from one DCN to a different DCN, a redirection procedure via RAN may be used to forward a Non-Access Stratum (NAS) message of the UE to the target DCN.

In some examples, all selection functions are aware of DCN(s), including the NNSF of RAN nodes, for selecting and maintaining the appropriate DCN for the UEs.

There is also UE-assisted dedicated core network selection or eDECOR. This feature is to reduce the need for DECOR reroute by using an indication (DCN-ID) sent from the UE and used by RAN to select the correct DCN. The DCN-ID can be assigned to the UE by the serving PLMN and can be stored in the UE per PLMN ID. Both standardized and operator specific values for DCN-ID are possible. The UE can use the PLMN specific DCN-ID whenever a PLMN specific DCN-ID is stored for the target PLMN.

A home PLMN (HPLMN) may provision the UE with a single default standardized DCN-ID which shall be used by the UE only if the UE has no PLMN specific DCN-ID of the target PLMN. When a UE configuration is changed with a new default standardized DCN-ID, the UE shall delete all stored PLMN specific DCN-IDs.

The UE provides the DCN-ID to RAN at registration to a new location in the network, that is, in the Attach, TAU and RAU. RAN selects serving node (MME or SGSN) based on the DCN-ID provided by the UE and configuration in RAN. For E-UTRAN the eNB is configured with DCNs supported by the connected MMEs at the setup of the S1 connection. For UTRAN and GERAN the BSS/RNC is configured with the DCNs supported in the connected SGSN via O&M. Both standardized DCN-IDs and PLMN specific DCN-IDs can in the RAN configuration be assigned to the same network. If information provided by the UE (e.g., Globally Unique Temporary ID (GUTI), NRI, etc.) indicates a node (MME or SGSN) for attach/TAU/RAU and a serving node (MME or SGSN) corresponding to the UE information can be found by the RAN node, the normal node selection shall take precedence over the selection based on DCN-ID. At registration the MME/SGSN may check if the correct DCN is selected. If the MME/SGSN concludes that the selected DCN is not the correct DCN, a DECOR reroute is performed and the SGSN/MME in the new DCN assigns a new DCN-ID to the UE. The serving MME/SGSN can also assign a new DCN-ID to the UE if, for example, the DCN-ID in the UE has become obsolete or when the UE Usage Type has been updated in the subscription information leading to a change of DCN. This is performed as part of the GUTI Reallocation procedure.

Slicing in 5GC

A network slice (or just a slice) is defined within a PLMN and includes the Core Network Control Plane and User Plane Network Functions, and, in the serving PLMN, at least one of the following: a New Generation (NG) RAN, or a Non-3GPP Interworking Function (N3IWF) to the non-3GPP Access Network. A network slice can be viewed as a virtual end-to-end network (e.g., network virtualization). A device, such as a UE, can connect to multiple network slices at the same time. Instances of network slices can include instances for IoT, public safety, eMBB, and others. Moreover, by enabling Network Slicing, an operator can rent services to different clients. For example, there can be an eMBB slice and/or a V2X slice can be supported, with the latter possibly being an automotive client-specific instance.

Network slices may differ for supported features and network functions optimizations. The operator may deploy multiple Network Slice instances delivering exactly the same features but for different groups of UEs, e.g., as they deliver a different committed service and/or because they may be dedicated to a customer.

A single UE can simultaneously be served by one or more Network Slice instances via a 5G-AN. A single UE may be served by, for example, at most eight Network Slices at a time. The AMF instance serving the UE logically belongs to each of the Network Slice instances serving the UE, that is, this AMF instance is common to the Network Slice instances serving a UE. The AMF can be viewed as the architecture's common point to the various Network Slices.

The selection of the set of Network Slice instances, where each of the Network Slice instances can correspond to one or more Allowed S-NSSAIs, for a UE is triggered by the first contacted AMF in a registration procedure normally by interacting with the NSSF, and it may lead to change of AMF.

SMF discovery and selection within the selected Network Slice instance is initiated by the AMF when a SM message to establish a packet data unit (PDU) session is received from the UE. The NF repository function (NRF) is used to assist the discovery and selection tasks of the required network functions for the selected Network Slice instance.

A PDU session belongs to one and only one specific Network Slice instance per PLMN. Different Network Slice instances do not share a PDU session, though different slices may have slice-specific PDU sessions using the same DNN.

In some aspects, identification and selection of a Network Slice is based on the S-NSSAI and the NSSAI. In an example, an S-NSSAI identifies a Network Slice. An S-NSSAI may be comprised of: a Slice/Service type (SST), which refers to the expected Network Slice behavior in terms of features and services and/or A Slice Differentiator (SD), which is optional information that complements the Slice/Service type(s) to differentiate amongst multiple Network Slices of the same Slice/Service type.

The S-NSSAI can have standard values or PLMN-specific values. S-NSSAIs with PLMN-specific values are associated to the PLMN ID of the PLMN that assigns it. An S-NSSAI shall not be used by the UE in access stratum procedures in any PLMN other than the one to which the S-NSSAI is associated.

The NSSAI is a collection of S-NSSAIs. There can be, for example, at most 8 S-NSSAIs in the NSSAI sent in signaling messages between the UE and the Network. Each S-NSSAI assists the network in selecting a particular Network Slice instance. The same Network Slice instance may be selected by means of different S-NSSAIs. Based on the operator's operational or deployment needs, multiple Network Slice instances of a given S-NSSAI may be deployed in the same or in different registration areas. When multiple Network Slice instances of a given S-NSSAI are deployed in the same registration area, the AMF instance serving the UE may logically belong to more than one Network Slice instances of that S-NSSAI, i.e. this AMF instance may be common to multiple Network Slice instances of that S-NSSAI. When a S-NSSAI is supported by more than one Network Slice instance in a PLMN, any of the Network Slice instances supporting the same S-NSSAI in a certain area may serve, as a result of the Network Slice instance selection procedure, a UE which is allowed to use this S-NSSAI. Upon association with an S-NSSAI, the UE is served by the same Network Slice instance for that S-NSSAI until cases occur where, e.g., Network Slice instance is no longer valid in a given registration area, or a change in UE's Allowed NSSAI occurs etc.

The selection of a Network Slice instance(s) serving a UE and the Core Network Control Plane and user plane Network Functions corresponding to the Network Slice instance is the responsibility of 5GC. The (R)AN may use Requested NSSAI in access stratum signaling to handle the UE Control Plane connection before the 5GC informs the (R)AN of the Allowed NSSAI. The Requested NSSAI is not used by the RAN for routing when the UE provides also a Temporary User ID. When a UE is successfully registered, the CN informs the (R)AN by providing the whole Allowed NSSAI for the Control Plane aspects. When a PDU Session for a given S-NSSAI is established using a specific Network Slice instance, the CN provides to the (R)AN the S-NSSAI corresponding to this Network Slice instance to enable the RAN to perform access specific functions. Subscription information may contain multiple S-NSSAIs. One or more of the Subscribed S-NSSAIs can be marked as default S-NSSAI. At most eight S-NSSAIs can be marked as default S-NSSAI. However, the UE may subscribe to more than eight S-NSSAIs. If an S-NSSAI is marked as default, then the network is expected to serve the UE with the related Network Slice when the UE does not send any valid S-NSSAI to the network in a Registration Request message. Subscription Information for each S-NSSAI may contain multiple DNNs and one default DNN. The NSSAI the UE provides in the Registration Request is verified against the user's subscription data.

UE NSSAI Configuration and NSSAI Storage Aspects

A UE can be configured by the HPLMN with a Configured NSSAI per PLMN. A Configured NSSAI can be PLMN-specific and the HPLMN indicates to what PLMN(s) each Configured NSSAI applies, including whether the Configured NSSAI applies to all PLMNs, that is, the Configured NSSAI conveys the same information regardless of the PLMN the UE is accessing (e.g., this could be possible for NSSAIs containing only standardized S-NSSAIs). When providing a Requested NSSAI to the network upon registration, the UE in a given PLMN shall only use S-NSSAIs belonging to the Configured NSSAI, if any, of that PLMN. Upon successful completion of a UE's registration procedure, the UE may obtain from the AMF an Allowed NSSAI for this PLMN, which may include one or more S-NSSAIs. These S-NSSAIs are valid for the current Registration Area provided by the serving AMF the UE has registered with and can be used simultaneously by the UE (e.g., up to the maximum number of simultaneous Network Slices or PDU sessions). The UE may also obtain from the AMF one or more temporarily or permanently rejected S-NSSAIs.

The Allowed NSSAI can take precedence over the Configured NSSAI for this PLMN. The UE can use only the S-NSSAI(s) in the Allowed NSSAI corresponding to a Network Slice for the subsequent procedures in the serving PLMN.

In an aspect, the UE may store (S)NSSAIs based on the type of (S)NSSAI. For example. When the UE is provisioned with a Configured NSSAI for a PLMN in the UE, the Configured NSSAI may be stored in the UE until a new Configured NSSAI for this PLMN is provisioned in the UE by the HPLMN: when provisioned with a new Configured NSSAI for a PLMN, the UE is to both replace any stored Configured NSSAI for this PLMN with the new Configured NSSAI, and delete any stored Allowed NSSAI and rejected S-NSSAI for this PLMN.

In some examples, when an Allowed NSSAI for a PLMN is received, the Allowed NSSAI may be stored in the UE, including when the UE is turned off, until a new Allowed NSSAI for this PLMN is received. When a new Allowed NSSAI for a PLMN is received, the UE may replace any stored Allowed NSSAI for this PLMN with this new Allowed NSSAI.

In some examples, when a temporarily rejected S-NSSAI for a PLMN is received, the temporarily rejected S-NSSAI may be stored in the UE while RM-REGISTERED.

In some examples, when a permanently rejected S-NSSAI for a PLMN is received, permanently rejected S-NSSAI may be stored in the UE while RM-REGISTERED.

One or multiple of the S-NSSAIs in the Allowed NSSAI provided to the UE can have non-standardized values, which may not be a part of the UE's NSSAI configuration. In such cases, the Allowed NSSAI includes mapping information how the S-NSSAIs in the Allowed S-NSSAI correspond to S-NSSAI(s) in the Configured NSSAI in the UE. The UE uses this mapping information for its internal operation (e.g., finding an appropriate network slice for UE's services). Specifically, a UE application, which is associated with an S-NSSAI as per NSSP, is further associated with the corresponding S-NSSAI from the Allowed NSSAI.

In some aspects, User Plane connectivity to a Data Network is established via a Network Slice instance(s). In an example, the establishment of User Plane connectivity to a Data Network via a Network Slice instance(s) comprises: performing a RM procedure to select an AMF that supports the required Network Slices and establishing one or more PDU session to the required Data network via the Network Slice Instance(s).

In some aspects, a Serving AMF may be selected to support the Network Slices. In an example, when a UE registers with a PLMN, if the UE for this PLMN has a Configured NSSAI or an Allowed NSSAI, the UE may provide to the network in RRC and NAS layers a Requested NSSAI containing the S-NSSAI(s) corresponding to the Network Slice(s) to which the UE wishes to register, in addition to the Temporary User ID if one was assigned to the UE. The Requested NSSAI may be either: (a) the Configured-NSSAI, or a subset thereof as described below, if the UE has no Allowed NSSAI for the serving PLMN; (b) the Allowed-NSSAI, or a subset thereof as described below, if the UE has an Allowed NSSAI for the serving PLMN; or (c) the Allowed-NSSAI, or a subset thereof as described below, plus one or more S-NSSAIs from the Configured-NSSAI for which no corresponding S-NSSAI is present in the Allowed NSSAI and that were not previously permanently rejected (as defined below) by the network.

In some examples, the subset of Configured-NSSAI provided in the Requested NSSAI may consist of one or more S-NSSAI(s) in the Configured NSSAI applicable to this PLMN, if the S-NSSAI was not previously permanently rejected (as defined below) by the network, or was not previously added by the UE in a Requested NSSAI.

In some examples, the subset of Allowed NSSAI provided in the Requested NSSAI may consist of one or more S-NSSAI(s) in the last Allowed NSSAI for this PLMN.

In an aspect, the UE may provide in the Requested NSSAI an S-NSSAI from the Configured NSSAI that the UE previously provided to the serving PLMN in the present Registration Area if the S-NSSAI was not previously permanently rejected (as defined below) by the network.

In some examples, the UE can include the Requested NSSAI at RRC Connection Establishment and in NAS messages. The RAN can route the NAS signaling between this UE and an AMF selected using the Requested NSSAI obtained during RRC Connection Establishment. If the RAN is unable to select an AMF based on the Requested NSSAI, the RAN may route the NAS signaling to an AMF from a set of default AMFs.

In some examples, when a UE registers with a PLMN, if for this PLMN the UE has no Configured NSSAI or Allowed NSSAI, the RAN may route all NAS signaling from/to this UE to/from a default AMF. In an example, the UE may not indicate any NSSAI in RRC Connection Establishment or Initial NAS message unless it has a Configured NSSAI or Allowed NSSAI for the corresponding PLMN. When receiving from the UE a Requested NSSAI and a 5G-S-TMSI in RRC, if the RAN can reach an AMF corresponding to the 5G-S-TMSI, then the RAN may forward the request to this AMF. Otherwise, the RAN may select a suitable AMF based on the Requested NSSAI provided by the UE and may forward the request to the selected AMF. If the RAN is not able to select an AMF based on the Requested NSSAI, then the request may be sent to a default AMF.

In an aspect, when the AMF selected by the AN receives the UE Initial Registration request: (a) the AMF, as part of the registration procedure, may query the Unified Data Management (UDM) to retrieve UE subscription information including the Subscribed S-NSSAIs; (b) the AMF may verify whether the S-NSSAI(s) in the Requested NSSAI are permitted based on the Subscribed S-NSSAIs; (c) the AMF, when the UE context in the AMF does not yet include an Allowed NSSAI, may query the NSSF (see (B) below for subsequent handling), except in the case when, based on configuration in this AMF, the AMF is allowed to determine whether it can serve the UE (see (A) below for subsequent handling). In an example, this configuration may depend on operator's policy; or (d) the AMF, when the UE context in the AMF already includes an Allowed NSSAI, based on configuration for this AMF, may determine whether the AMF can serve the UE (see (A) below for subsequent handling). This configuration may depend on the operator's policy.

(A) Depending on fulfilling the configuration as described above, the AMF may be allowed to determine whether it can serve the UE, and the following may be performed: The AMF may check whether the AMF can serve all the S-NSSAI(s) from the Requested NSSAI present in the Subscribed S-NSSAIs, or all the S-NSSAI(s) marked as default in the Subscribed S-NSSAIs in case no Requested NSSAI was provided. If this is the case, the AMF may remain the serving AMF for the UE. The Allowed NSSAI may then be composed of the list of S-NSSAI(s) in the Requested NSSAI permitted based on the Subscribed S-NSSAIs, or, if no Requested NSSAI was provided, all the S-NSSAI(s) marked as default in the Subscribed S-NSSAIs (see (C) below for subsequent handling). If this is not the case, the AMF may query the NSSF (see (B) below for subsequent handling).

(B) When the AMF needs to query the NSSF, as described above, the following may be performed: the AMF may query the NSSF, with the Requested NSSAI, the Subscribed S-NSSAIs, the PLMN ID of the SUPI, the location information, and/or possibly access technology being used by the UE. Based on this information, local configuration, and other locally available information including RAN capabilities in the Registration Area, the NSSF may perform the following: (a) the NSSF may select the Network Slice instance(s) to serve the UE. When multiple Network Slice instances in the registration area are able to serve a given S-NSSAI, based on operator's configuration, the NSSF may select one of them to serve the UE, or the NSSF may defer the selection of the Network Slice instance until a NF/service within the Network Slice instance needs to be selected; (b) the NSSF may determine the target AMF Set to be used to serve the UE, or, based on configuration, the list of candidate AMF(s), possibly after querying the NRF; (c) the NSSF may determine the Allowed NSSAI, possibly taking also into account the availability of the Network Slice instances that are able to serve the S-NSSAI(s) in the Allowed NSSAI in the current registration area; (d) based on operator configuration, the NSSF may determine the NRF(s) to be used to select NFs/services within the selected Network Slice instance(s); (e) the NSSF may perform additional processing to determine the Allowed NSSAI in roaming scenarios; (f) the NSSF may return to the current AMF the Allowed NSSAI and the target AMF Set, or, based on configuration, the list of candidate AMF(s). The NSSF may return the NRF(s) to be used to select NFs/services within the selected Network Slice instance(s). The NSSF may also return information regarding rejection causes for S-NSSAI(s) not included in the Allowed NSSAI which were part of the Requested NSSAI; (g) the AMF, depending on the available information and based on configuration, may query the NRF with the target AMF Set. The NRF returns a list of candidate AMFs; or (h) the AMF, if rerouting to a target serving AMF is necessary, may reroute the Registration Request to a target serving AMF (C) The serving AMF can return to the UE the Allowed NSSAI. The AMF may also indicate to the UE for Requested S-NSSAI(s) not included in the Allowed NSSAI, whether the rejection is permanent (e.g. the S-NSSAI is not supported in the PLMN) or temporary (e.g. the S-NSSAI is not currently available in the Registration Area). Upon successful Registration, the UE may be provided with a 5G Secondary Temporary Mobile Subscriber Identity (TMSI) (5G-S-TMSI) by the serving AMF. The UE may include this 5G-S-TMSI in any RRC Connection Establishment during subsequent initial accesses to enable the RAN to route the NAS signaling between the UE and the appropriate AMF.

If the UE receives an Allowed NSSAI from the serving AMF, the UE may store this new Allowed NSSAI and override any previously stored Allowed NSSAI for this PLMN.

In an aspect, the set of Network Slice(s) for a UE may be modified. The set of Network Slices for a UE can be changed at any time while the UE is registered with a network, and may be initiated by the network, or the UE under certain conditions as described below. In some examples, the registration area allocated by the AMF to the UE may have homogeneous support for network slices.

The network, based on local policies, subscription changes and/or UE mobility, operational reasons (e.g., a Network Slice instance is no longer available), may change the set of Network Slice(s) to which the UE is registered and provide the UE new Allowed NSSAI. The network may perform such change during a Registration procedure or trigger a notification towards the UE of the change of the Network Slices using a Generic UE Configuration Update procedure. The new Allowed NSSAI may then be determined (an AMF Relocation may be needed). The AMF may provide the UE with the new Allowed NSSAI and TAI list, and: (a) if the changes to the Allowed NSSAI do not require the UE to perform a registration procedure: (1) the AMF may indicate that acknowledgement is required, but does not indicate the need to perform a registration procedure; (2) the UE may respond with a UE configuration update complete message for the acknowledgement; and/or (3) the UE may respond with a UE configuration update complete message for the acknowledgement; (b) if the changes to the Allowed NSSAI require the UE to perform a registration procedure (e.g., the new S-NSSAIs require a separate AMF that cannot be determined by the current serving AMF): (1) the serving AMF may indicate to the UE that a current 5G-GUTI is invalid and the need for the UE to perform a registration procedure after entering CM-IDLE state. The AMF shall release the NAS signaling connection to the UE to allow to enter CM-IDLE based on local policies (e.g. immediately or delayed release). The UE shall not perform a Registration procedure before entering Connection Management (CM)-IDLE state; and/or (2) The UE initiates a registration procedure after the UE enters CM-IDLE state. The UE may include subscription Permanent Identification (SUPI) and new Allowed NSSAI in the registration in this case.

When a Network Slice used for one or multiple PDU Sessions is no longer available for a UE, in addition to sending the new Allowed NSSAI to the UE, the following may apply: (a) in the network, if the Network Slice is no longer available under the same AMF (e.g. due to UE subscription change), the AMF may indicate to the SMF(s) corresponding to the relevant S-NSSAI to autonomously release the UE's SM context; (b) in the network, if the Network Slice becomes no longer available with AMF relocation (e.g. due to Registration Area change), the new AMF may indicate to the old AMF that the PDU Session(s) associated with the relevant S-NSSAI can be released, and the old AMF informs the corresponding SMF(s) to autonomously release the UE's SM context; or (c) in the UE, the PDU session(s) context may be implicitly released after receiving the Allowed NSSAI in the Registration Accept message.

In some examples, the UE may use UE Configuration (e.g., network slice security policy or NSSP) to determine whether ongoing traffic can be routed over existing PDU sessions belonging to other Network Slices or may establish new PDU session(s) associated with same/other Network Slice.

In order to change the set of S-NSSAIs being used, the UE can initiate a Registration procedure.

Change of set of S-NSSAIs to which the UE is registered (whether UE or Network initiated) may lead to AMF change subject to operator policy.

In an aspect, AMF Relocation may be due to Network Slice(s) Support. In an example, during a Registration procedure in a PLMN, in case the network decides that the UE should be served by a different AMF based on Network Slice(s) aspects, then the AMF that first received the Registration Request may redirect the Registration request to another AMF via the RAN or via direct signaling between the initial AMF and the target AMF. The redirection message sent by the AMF via the RAN may include information for selection of a new AMF to serve the UE.

For a UE that is already registered, the system may support a redirection initiated by the network of a UE from its serving AMF to a target AMF due to Network Slice(s) considerations (e.g., the operator has changed the mapping between the Network Slice instances and their respective serving AMF(s)). In some examples, operator policy may determine whether redirection between AMFs is allowed.

In an aspect, a PDU session may be connected to a required Network Slice Instance(s). The establishment of a PDU session in a Network Slice to a DN allows data transmission in a Network Slice. A Data Network may be associated to an S-NSSAI and a DNN.

In an example, the network operator (e.g., HPLMN) may provision the UE with NSSP. The NSSP includes one or more NSSP rules each one associating an application with a certain S-NSSAI. A default rule which matches all applications to a S-NSSAI may also be included. When a UE application associated with a specific S-NSSAI requests data transmission, then: if the UE has one or more PDU sessions established corresponding to the specific S-NSSAI, the UE may route the user data of this application in one of these PDU sessions, unless other conditions in the UE prohibit the use of these PDU sessions. If the application provides a DNN, then the UE may also consider this DNN to determine which PDU session to use.

The UE can store the NSSP until a new NSSP is provided to the UE by the HPLMN. If the UE does not have a PDU session established with this specific S-NSSAI, the UE may request a new PDU session corresponding to this S-NSSAI and with the DNN that may be provided by the application. In order for the RAN to select a proper resource for supporting network slicing in the RAN, the RAN may be aware of the Network Slices used by the UE.

In an example, if a Network Slice instance was not selected during the Registration procedure for this specific S-NSSAI, the AMF may query the NSSF with this specific S-NSSAI, location information, PLMN ID of the SUPI to select the Network Slice instance to serve the UE and to determine the NRF to be used to select NFs/services within the selected Network Slice instance.

In an example, the AMF may query the NRF to select an SMF in a Network Slice instance based on S-NSSAI, DNN and other information (e.g. UE subscription and local operator policies), when the UE triggers the establishment of a PDU session. The selected SMF may establish a PDU session based on S-NSSAI and DNN.

In an example, when the AMF belongs to multiple Network Slices, based on configuration, the AMF may use an NRF at the appropriate level for the SMF selection.

In an aspect, Network Slicing may be performed through interworking with evolved packet system (EPS). A 5GC which supports Network Slicing might need to interwork with the EPS in the 5GC's PLMN or in other PLMNs, and the EPC may support the DCN in which MME selection may be assisted by a DCN-ID provided by the UE to the RAN. If the UE is in Evolved CM (ECM)-IDLE or CM-IDLE state, mobility may trigger a Tracking Area Update (TAU) (or Attach, if it is the first mobility event in the target system) in EPS and a Registration procedure in 5GS. These procedures are sufficient to place the UE in the right DCN or (set of) Network Slice(s).

Figure 2:
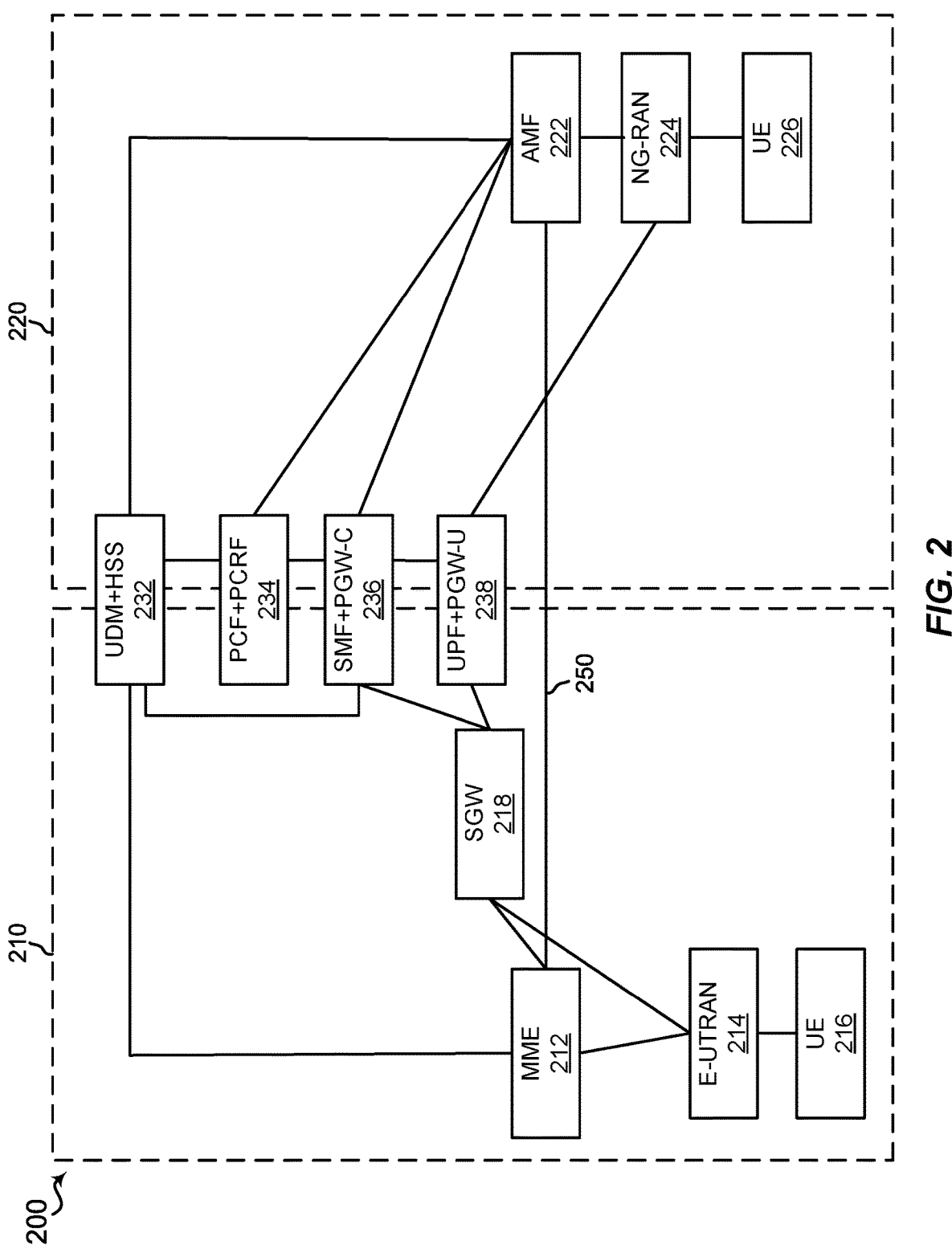
FIG. 2 is a block diagram illustrating an example of a non-roaming architecture for interworking between 5GS and EPC.

For Connected mode mobility/interworking 5GC to EPC and vice versa (e.g., EPC to 5GC): when a UE CM state in the AMF is CM-CONNECTED in 5GC and a handover to EPS occurs, the AMF may select the target MME and may forward the UE context to the selected MME over an MME-AMF Interface (see e.g., FIG. 2). The handover procedure may then be executed. When the handover completes, the UE performs a TAU. This completes the UE registration in the target EPS and as part of this the UE may obtain a DCN-ID if the target EPS uses the DCN-ID. It is open and can be implemented in different ways how an AMF selects the target MME in case of a UE handover from 5GC to an EPC supporting DCN.

The handover between 5GC to EPC does not guarantee all active PDU session(s) of Network Slice(s) can be transferred to the EPC, thus some PDU session(s) may be dropped. When a UE is ECM-CONNECTED in EPC, and performs a handover to 5GS, the MME may select the target AMF based on any available local information (including the UE Usage Type if one is available for the UE in the subscription data) and may forward the UE context to the selected AMF over the MME-AMF interface. The handover procedure is the executed. When the Handover is complete, the UE may perform a Registration procedure. This completes the UE registration in the target 5GS and as part of this the UE may obtain an Allowed NSSAI. Whether there is a limitation to the number of Network Slices supported per UE when interworking with EPS is supported is open and can be implemented in different ways.

EPC/5GC Interworking

FIG. 2 shows a diagram 200 that illustrates an example of a non-roaming architecture 200 for interworking between EPC 210 and 5GS 220. Various aspects described herein with respect to a non-roaming architecture may also apply to a roaming architecture.

With respect to FIG. 2, the architecture 200 may include a plurality of interfaces/reference points between modules. The interfaces may include an MME-AMF interface 250 which is an inter-CN interface between the MME 212 and 5GS AMF 222 in order to enable interworking between EPC 210 and the 5GS 220. As explained in further detail below, support for the MME-AMF interface 250 in the network is optional for interworking. In an example, the MME-AMF interface 250 may support a subset of the functionalities (essential for interworking) that are supported over reference points (not shown) between MMEs for MME relocation and MME to MME information transfer. These reference points can be used intra-PLMN or inter-PLMN (e.g. in the case of Inter-PLMN HO).

As shown by FIG. 2, the architecture 200 may also include a UDM+HSS unit 232, a policy control function (PCF)+policy and changing rules function (PCRF) 234, a SMF+PGW control (PGW-C) 236, and a user plane function (UPF)+PGW user (PGW-U) 238 dedicated for interworking between the EPC 210 and the 5GS 220. These units may be combined entities from the EPC 210 and the 5GS which support respective functionalities for interworking. However, one or more of these units (e.g., the PCF+PCRF 234, the SMF+PGW-C 236, and the UPF+PGW-U 238 may be optional and may be based on capabilities of one or more of UEs 216, 226 and the architecture 200. One or more UEs that are not subject to EPC 210 and 5GS 220 interworking may be served by entities not dedicated for interworking, that is, by one or more of PGW/PCRF for a UE subject to EPC 210 or SMF/UPF/PCF for a UE subject to 5GS 220.

In an example, the architecture 200 may also include another UPF (not shown in FIG. 2) between the NG-RAN 224 and the UPF+PGW-U 238 that is, the UPF+PGW-U 238 can support a reference point with an additional UPF, if needed. FIG. 2 and the procedures described herein in connection with FIG. 2 or similar architectures that depict an SGW 218 make no assumption whether the SGW 218 is deployed as a monolithic SGW or as an SGW split into its control-plane and user-plane functionality.

In order to interwork with EPC 210, a UE 216 or 226 that supports both 5GC 220 and EPC 210 (e.g., supports both 5G or NR as well as 4G technologies) can operate in single-registration mode or dual-registration mode.

In single-registration mode, a UE may only have one active mobility management (MM) state (e.g., either RM state in 5GC 220 or EPS mobility management (EMM) state in EPC 210) and it is either in 5GC NAS mode or in EPC NAS mode (when connected to 5GC 220 or EPC 210, respectively). The UE may maintain a single coordinated registration for 5GC 220 and EPC 210.

In dual-registration mode, the UE can handle independent registrations for 5GC 220 and EPC 210. In this mode, the UE may be registered to 5GC 220 only, EPC 210 only, or to both 5GC 220 and EPC 210.

In an example, support of single registration mode can be mandatory for UEs that support both 5GC NAS and EPC NAS.

In an example, during a E-UTRAN Initial Attachment procedure, a UE supporting both 5GC NAS and EPC NAS may need to indicate its support of 5G NAS in UE Network Capability. For example, during registration to 5GC 220, the UE supporting both 5GC NAS and EPC NAS may need to indicate its support of EPC NAS. This indication may be used to give the priority towards selection of SMF+PGW-C 236 for UEs that support both EPC NAS and 5GC NAS.

Networks that support interworking with EPC 210, may support interworking procedures that use the MME-AMF interface 250 or interworking procedures that do not use the MME-AMF interface 250. Interworking procedures with the MME-AMF interface 250 may support providing IP address continuity on inter-system mobility to UEs that support 5GC NAS and EPC NAS. Networks that support interworking procedures without the MME-AMF interface 250 may support procedures to provide IP address continuity on inter-system mobility to UEs operating in both single-registration mode and dual-registration mode.

In some examples, the terms "initial attach," "handover attach," and "TAU" for the UE procedures in EPC 210 can alternatively be combined EPS/International Mobile Subscriber Identity (IMSI) Attach and/or combined Tracking Area (TA)/Location Area (LA) depending on the UE configuration.

In an aspect, interworking procedures using the MME-AMF interface 250 may enable the exchange of MM and session management (SM) states between a source network and a target network. Handover procedures may support with the MME-AMF interface 250. When interworking procedures with the MME-AMF interface 250 are used, the UE may operate in single-registration mode. The network may retain only one valid MM state for the UE, either in the AMF 222 or the MME 212. In an example, either the AMF 222 or the MME 212 is registered in the HSS+UDM 232.

In some examples, support for the MME-AMF interface 250 between AMF 222 in 5GC 220 and the MME 212 in EPC 210 may be needed to enable seamless session continuity (e.g., for voice services) for inter-system change.

When the UE supports single-registration mode and the network supports interworking procedure with the MME-AMF interface 250: (a) the UE, for idle-mode mobility from 5GC 220 to EPC 210, may perform a TAU procedure with EPS GUTI mapped from 5G-GUTI sent as old Native GUTI. The MME 212 may retrieve the UE's MM and SM context from 5GC 220 if the UE has a PDU session established or if the UE or the EPC support "attach without PDN connectivity". The UE may perform an attach procedure if the UE is registered without PDU session in 5GC 220 and the UE or the EPC 210 does not support attach without PDN connectivity. For connected-mode mobility from 5GC 220 to EPC 210, an inter-system handover may be performed. During the TAU or Attach procedure, the HSS+UDM 232 may cancel any AMF registration; and (b) the UE, for idle-mode mobility from EPC 210 to 5GC 220, may perform a registration procedure with the EPS GUTI sent as the old GUTI. The AMF 222 and the SMF+PGW-C 236 may retrieve the UE's MM and SM context from EPC 210. For connected-mode mobility from EPC 210 to 5GC 220, inter-system handover is performed. During the Registration procedure, the HSS+UDM 232 may cancel any MME registration.

In some examples, interworking may occur without the MME-AMF interface 250. In this example, IP address continuity may be provided to the UEs on inter-system mobility by storing and fetching SMF+PGW-C information and corresponding APN/DDN information via the HSS+UDM 232. Such networks may also provide an indication that dual registration mode is supported to UEs during initial Registration in 5GC. This indication may be valid for the entire PLMN. UEs that operate in dual-registration mode may use this indication to decide whether to register early in the target system. UEs that operate in single-registration mode may use this indication.

Interworking procedures without the MME-AMF interface 250 may use the following two items: (1) When PDU sessions are created in 5GC 220, the SMF+PGW-C 236 may update its information along with DNN in the HSS+UDM 232; or the HSS+UDM 232 may provide the information about dynamically allocated SMF+PGW-C information and APN/DNN information to the target CN network.

In some examples, to support mobility for dual-registration mode UEs, the following additional items may also be supported by the network: (3) the MME 212, when the UE performs Initial Attach in EPC 210 and provides an indication that the old node was an AMF 222, may not include "initial attach" indicator to the HSS+UDM 232. This may result in the HSS+UDM 232 not cancelling the registration of AMF 222, if any; (4) the AMF 222, when the UE performs Initial Registration in 5GC 220 and provides the EPS GUTI, may not include "initial attach" indicator to the HSS+UDM 232. This may result in the HSS+UDM 232 not cancelling the registration of MME 212, if any; or (5) the MME 212, when PDN connections are created in EPC 210, may store the SMF+PGW-C information and APN information in the HSS+UDM 232.

In some examples, the network may support item 3 above to provide IP address preservation to UEs operating in single-registration mode when the UE moves from 5GC 220 to EPC 210. In some examples, the network may support items 4 and 5, described above, along with item 6, described below, to provide IP address preservation to UEs operating in single-registration mode when the UE moves from EPC 210 to 5GC 220. In the following item (6), the AMF 222, when the UE performs mobility Registration in the 5GC 220 and provides an EPS GUTI, may determine that the old node is MME 212 and may proceed with the procedure and provide a "Handover PDU Session Setup with EPC Supported" indication to the UE in the Registration Accept message.

In an aspect, mobility may be provided for UEs in single-registration mode. For example, when the UE supports single-registration mode and the network supports interworking procedure without the MME-AMF interface 250: (a) For mobility from 5GC to EPC, the UE that has received the network indication that dual registration mode is supported may either: (1) perform Attach in EPC with Request type "Handover" in PDN CONNECTIVITY Request message and subsequently moves all its other PDU sessions using the UE requested PDN connectivity establishment procedure with Request Type "handover" flag, or (2) perform TAU with 4G-GUTI mapped from 5G-GUTI, in which case the MME 202 may instruct the UE to re-attach. IP address preservation is not provided in this case. In an example, the first PDN connection may be established during the E-UTRAN Initial Attach procedure. In some examples, at inter-PLMN mobility the UE may use the TAU procedure; or (b) the UE, for mobility from EPC to 5GC, may perform Registration of type "mobility registration update" in 5GC with 5G-GUTI mapped from EPS GUTI. The AMF 204 may determine that old node is an MME 202, but proceeds as if the Registration is of type "initial registration". In an example, the Registration Accept includes "Handover PDU Session Setup Support" indication to the UE. Based on this indication, the UE may subsequently either: (1) move all PDN connections of the UE from EPC using the UE initiated PDU session establishment procedure with "Existing PDU Sessions" flag, or (2) re-establish PDU sessions corresponding to the PDN connections that the UE had in EPS. In this case, IP address preservation may not be provided.

In an aspect, mobility may be provided for UEs in dual-registration mode. For example, to support mobility in dual-registration mode, the support of MME-AMF interface 250 between AMF 204 in 5GC and MME 202 in EPC may not be required. Instead, for UE operating in dual-registration mode the following principles may apply for PDU session transfer from 5GC to EPC: (a) the UE operating in Dual Registration mode may register in EPC ahead of any PDU session transfer using the Attach procedure without establishing a PDN Connection in EPC if the EPC supports EPS Attach without PDN Connectivity. In some examples, support for EPS Attach without PDN Connectivity may be mandatory for a UE supporting dual-registration procedures. Before attempting early registration in EPC the UE may need to check whether EPC supports EPS Attach without PDN Connectivity by reading the related SIB in the target cell; (b) the UE may perform PDU session transfer from 5GC to EPC using the UE initiated PDN connection establishment procedure with "handover" indication in the PDN Connection Request message; (c) if the UE has not registered with EPC ahead of the PDU session transfer, the UE can perform Attach in EPC with "handover" indication in the PDN Connection Request message; (d) the UE may selectively transfer certain PDU sessions to EPC, while keeping other PDU Sessions in 5GC; (e) the UE may maintain the registration up to date in both 5GC and EPC by re-registering periodically in both systems. In some examples, if the registration in either 5GC or EPC times out (e.g. upon mobile reachable timer expiry), the corresponding network may start an implicit detach timer. In some examples, whether the UE transfers some or all PDU sessions on the EPC side and whether the UE maintains the registration up to date in both EPC and 5GC can depend on UE capabilities that are implementation dependent. In some examples, the information for determining which PDU sessions are transferred on EPC side and the triggers can be pre-configured in the UE.

In an aspect, for a UE operating in dual-registration mode the following principles may apply for PDN connection transfer from EPC to 5GC: (a) a UE operating in Dual Registration mode may register in 5GC ahead of any PDN connection transfer using the Registration procedure without establishing a PDU session in 5GC; (b) a UE may perform PDN connection transfer from EPC to 5GC using the UE initiated PDU session establishment procedure with "Existing PDU Session" indication; (c) the UE, if the UE has not registered with 5GC ahead of the PDN connection transfer, may perform Registration in 5GC with "Existing PDU Session" indication in the PDU Session Request message. In some examples, support of Registration combined with PDU Session Request may still be open and may be implemented in different ways; (d) the UE may selectively transfer certain PDN connections to 5GC, while keeping other PDN Connections in EPC; (e) the UE may maintain the registration up to date in both EPC and 5GC by re-registering periodically in both systems. In some examples, if the registration in either EPC or 5GC times out (e.g. upon mobile reachable timer expiry), the corresponding network may start an implicit detach timer. In an example, whether the UE transfers some or all PDN connections on the 5GC side and whether the UE maintains the registration up to date in both 5GC and EPC can depend on UE capabilities that are implementation dependent. In some examples, the information for determining which PDN connections are transferred on the 5GC side and the triggers can be pre-configured in the UE. In an example, if EPC does not support EPS Attach without PDN Connectivity, the MME 202 may detach the UE when the last PDN connection is released by the PGW (in relation to transfer of the last PDN connection to non-3GPP access); or (f) the network, when sending a control plane request for Mobile Telecommunication (MT) services (e.g., MT SMS), may route the control plane via either the EPC or the 5GC. In some examples, in absence of a UE response, the network may attempt routing the control plane request via the other system. In an example, the choice of the system through which the network attempts to deliver the control plane request first may be determined by network configuration.

In view of the above descriptions regarding the use of dedicated core networks (DCNs) in EPC, Network Slicing in 5GC, and EPC/5GC interworking, the following considerations may be needed.

With the deployment of Network Slicing mechanisms in 5GC networks, three scenarios need to be considered for the interworking between 5GC and EPC: (1) interworking with EPC not supporting Decor or eDecor; (2) interworking with EPC supporting Decor; and (3) interworking with EPC supporting eDecor Also, considering 5GC/EPC interworking solutions, it is relevant to consider the following cases: (1) a single-registration UE in a network supporting an MME-AMF interface; (2) a single-registration UE in a network supporting dual-registration (without an MME-AMF interface); and (3) a dual-registration UE in a network supporting dual-registration.

Deployment of Network Slices in the 5GC may need to be coordinated by an operator with the DCNs that the operator EPC supports. Multiple scenarios may need to be considered, for example (a) each 5GC Network Slice may correspond to a specific DCN (i.e., 1:1 mapping); and (b) multiple 5GC Network Slices correspond to a specific DCN (i.e., N:1 mapping)

In an example, if two Network Slices are "mutually exclusive" in the 5GC (e.g., the UE can be connected to one slice OR the other), it may be expected that these two Network Slices correspond to different DCNs in the EPC.

The issues for these combinations of scenarios can be summarized as follows: (a) The EPC has no concept of Network Slicing, and does not understand the information used by the UE and the 5GC for the support of Network Slicing; (b) if support of multiple Network Slices has slice co-existence issues (i.e., not all the Network Slices that the UE has subscribed to can be simultaneously supported by an AMF, and therefore no serving AMF can support any combinations of Network Slices for the UE), then specific AMFs may need to be selected to serve the UE for a subset of the Network Slices the UE subscribes to. This has been addressed in the definition of slicing mechanisms by returning to the UE an Allowed NSSAI, where the network ensures the S-NSSAIs (slices) in the Allowed NSSAI can co-exist. However, when a UE moves to the EPC after establishing connectivity to a set of Network Slices in the 5GC, or when the UE first establishes connectivity in the EPC, either: (1) the EPC, without Decor and eDecor, may not support all the PDN connections that correspond to the Network Slices the UE needs to connect to, or (2) in the EPC with Decor or eDecor, no DCN may exist that supports all the Network Slices the UE needs to connect to.

This means that either when the UE moves from 5GC to EPC or when a 5GC UE, configured for supporting multiple slicing and mapping application/services to Network Slices, first establishes connectivity in the EPC, appropriate connectivity may need to be provided by the EPC without Decor, or an appropriate DCN may be selected for the UE. This means: (a) when moving from 5GC to EPC without Decor, PDU sessions corresponding to the Network Slices for which the UE has established user plane connectivity in the 5GC may need to be moved to the EPC. In an example, not all such PDUs may be supported by the EPC, and some may be dropped/rejected. In an example, while in the EPC, the UE may activate additional PDN connections. In some examples, when the UE moves to the 5GC, the 5GC may not have context information mapping the active PDN connection to the appropriate slices, and therefore the 5GC may not be capable of: (1) selecting an appropriate serving AMF to support the required Network Slices, or (2) "distributing" the active PDU sessions to the Network Slices that the UE needs to be connected to; and (b) when moving from 5GC to EPC with Decor or eDecor, in addition to the problem listed above, a correct DCN may need to be selected to serve the UE. In an example, this may need to be possible both in case of handover and in case of idle mode mobility.

The following steps describe problems created by current methods to resolve the above described issues. In an aspect, "if the UE is in ECM-IDLE or CM-IDLE state, mobility triggers a TAU (or Attach, if it is the first mobility event in the target system) in EPS and a Registration procedure in 5GS. These procedures are sufficient to place the UE in the right DCN or (set of) Network Slice(s)." However, this statement is not entirely correct or accurate. In fact, the following may need to be considered: (a) for idle mode mobility from EPC to 5GC: In EPC (independently of whether in case of single radio the UE first registered in 5GC and then moved to EPC, or first registered in EPC), the UE may have a set of PDN connections each corresponding to an APN. These PDN connections may correspond to PDU sessions transferred from the 5GC, or established directly in the EPC, or a combination of both. If operators use generic APNs, or non-slice specific/dedicated APNs, for connectivity to specific slices, and have corresponding APNs for the use over EPC, then (1) in case of a single-registration UE and no MME-AMF interface, when the UE performs a Registration in the 5GC the UE can provide the needed Requested NSSAI thus the correct AMF and set of slices can be selected; (2) in case of dual registration, when the UE performs a Registration in the 5GC, the UE can provide the needed Requested NSSAI thus the correct AMF and set of slices can be selected; or (3) however, in case of a single-registration UE and MME-AMF interface, when the UE performs a Registration in the 5GC and the context is retrieved from the MME, the AMF may only receive a context containing the PDU sessions and the corresponding APNs, but may not receive any slicing information that would identify the Network Slices the UE needs to be connected to (in order to support the active PDU sessions), or the mapping between the PDU sessions and any slices.

In another aspect, "when a UE CM state in the AMF is CM-CONNECTED in 5GC and a handover to EPS occur, the AMF selects the target MME and forwards the UE context to the selected MME over the MME-AMF Interface." The EPC can select the AMF only based on the location of the target 5G-RAN node, without any considerations of slicing: this implies that the AMF that is selected as a "generic AMF" that must be capable of supporting simultaneously all the PDU sessions corresponding potentially to different slices in order to enable the mobility. Once the UE performs the Registration procedure at the end of the handover, the UE can provide the actual Requested NSSAI, and an AMF relocation may need to happen. However, the 5GC must deploy such "generic AMFs" to enable the handover.

In another aspect, "when a UE is ECM-CONNECTED in EPC, and performs a handover to 5GS . . . . When the Handover completes the UE performs a Registration procedure. This completes the UE registration in the target 5GS and as part of this the UE obtains an Allowed NSSAI." In the case where multiple 5GC slices correspond to a specific DCN, when the UE is connected to the EPC to a given DCN with one or more active PDN connections, unless explicit information is provided at a certain time to the 5GC in the mobility from EPC to 5GC, the 5GC may have no way to know to which slice a given PDU session correspond. This may be particularly true if a given APN can apply to multiple S-NSSAIs (i.e. non-slice specific APNs).

In another aspect, "UE operating in Dual Registration mode may register in EPC ahead of any PDU session transfer using the Attach procedure without establishing a PDN Connection in EPC if the EPC supports EPS Attach without PDN Connectivity." In this scenario, sufficient information may not exist to correctly select the DCN for the UE in such a way to enable correct interworking with the slices to which the UE is connected over the 5GC. Specifically, based on EPC mechanisms: (a) when Decor is supported, the MME/DCN may be selected solely based on EPC subscription information. In order to ensure that the correct DCN is selected, a UE Usage Type that can map to any combination of slices that the UE may have requested over 5GS is required, which may not be realistic in all cases. Also, this may require that a DCN exists that supports any combination of slices. If this is not the case, then when the UE moves PDU sessions to the EPC, the PDU sessions will be dropped even if an appropriate DCN existed in the EPC, simply because the selected DCN was based solely on subscription information; (b) when eDecor is supported, a DCN ID mapping to the set (or a subset) of slices that the UE has connectivity to over the 5GS may need to be provided by the UE, if it is possible for such a value to exist; or (c) the same may apply to the statement "if the UE has not registered with EPC ahead of the PDU session transfer, the UE can perform Attach in EPC with "handover" indication in the PDN Connection Request message."

In another aspect, "UE operating in Dual Registration mode may register in 5GC ahead of any PDN connection transfer using the Registration procedure without establishing a PDU session in 5GC. The UE performs PDN connection transfer from EPC to 5GC using the UE initiated PDU session establishment procedure with "Existing PDU Session" indication." If eDECOR is not used but the network supports DCNs, the UE may have no awareness of the DCN selected for the UE. In order to move the established PDN connection to the correct slices, based on the Requested NSSAI the UE provides at the Registration procedure in the 5GC: (a) there may need to be a correspondence between the DCN selected in EPC and the set of slices on the 5GC. At a minimum, the correct PGW/SMF node may need to have been selected if PDN connections were established in the EPC, to ensure that the PGW/SMF is part of the appropriate slice; or (b) there may need to be a correspondence between the APN used over the EPC for the PDN connections and the "APN+S-NSSAI" combination used for a PDU session in the 5GC; or (c) The same may apply to the text stating that "if the UE has not registered with 5GC ahead of the PDN connection transfer, the UE can perform Registration in 5GC with "Existing PDU Session" indication in the PDU Session Request message."

In another aspect, when a UE performs an attach or TAU in EPC and no DCN information is available, the MME may be selected by the RAN according to other factors. If this corresponds to a scenario in which a single registration UE is performing idle mode mobility from the 5GC to the EPC, the MME selected may not belong to the correct DCN to serve the UE based on the active PDN sessions and corresponding slices in the 5GC. According to mechanisms currently standardized for DCNs in EPC: (a) if the MME does not have sufficient information to determine whether it cans serve the UE, the MME may send an Authentication Information Request message to the HSS requesting UE Usage Type. The HSS, if supporting DCNs, may provide the UE Usage Type in the Authentication Information Answer message. The MME can therefore decide whether it can serve the UE or whether an MME in a different DCN needs to be selected. However, the UE Usage Type stored in the HSS is a semi-static configuration parameter that may not match the set of slices active for the UE in the 5GC. This is particularly true for devices that subscribe to a variety of slices, including slices that cannot co-exist; or (b) in case of idle mode mobility or a UE between MMEs, or idle-mode mobility of a single-registration UE between an AMF and the MME, the target MME receives the MM and SM context from the target node after the UE triggers the MM procedure (e.g. TAU) and the RAN selects the MME. However, in such scenarios no mechanisms are defined for the selected MME to determine whether it can serve the UE or whether redirection to another MME based on the MM/SM context is required.

Various solutions are described below that provide techniques or mechanism to enable interworking between 5GS network slicing and EPC connectivity. These solutions involve one or more of the following aspects: (a) enhance NSSP policies to map not only applications to slices (i.e. the S-NSSAI) and to the DNN, but also to the APN to be used when the UE is in the EPC; (b) enhance the UE functionality to maintain the mapping between active PDN connections and the corresponding S-NSSAI when the UE moves to the EPC or when new PDN connections are created while the UE is in the EPC. The UE may use such information when moving from EPC to 5GC and will provide it to the AMF during an RM procedure (e.g., Registration procedure); (c) enhance the AMF to be configured with a mapping between a set of S-NSSAIs in the Allowed S-NSSAI assigned to a UE to a DCN in the EPC; (d) enhance SMF/PGW-C selection functionality to ensure that the AMF selects an SMF considering the mapping between the S-NSSAIs in the Allowed NSSAI and DCNs in the EPC to ensure that the selected SMF/PGW-C is part of the mapped DCN from the Allowed NSSAI; or (e) ensure the UE Usage Type maintained in the HSS is augmented with a Temporary UE Usage Type set by the AMF based on the Allowed NSSAI, and pushed to HSS when an Allowed NSSAI is allocated to the UE. When an MME asks the UE Usage Type from the HSS, if the Temporary UE Usage Type is set, the HSS provides such value. In this way the MME can select the DCN serving the UE based on dynamic information and not just subscription information.

In more details, the solutions described above involve one or more mechanisms. In one aspect, (1) UE-maintained connections may be mapped to slicing information. In an example, when connecting to a 5GC with network slicing, the UE may use the configured NSSP to select the S-NSSAI (and DNN) to be used for an application. In combination with the Configured NSSAI, this may enable the UE to construct the needed Requested NSSAI to support services/applications in the UE. In order to enable interworking with EPC, the UE may maintain a mapping, for each active PDU session, of the <DNN, S-NSSAI> to a PDU Session ID for each active PDU session. In some examples, the UE may receive the corresponding NSSAI in a Protocol Configuration Option (PCO) field in response to a new PDN connection being created while the UE is in the EPC.

In some examples, for each <DNN, S-NSSAI> mapping for an application/service, the NSSP may also contain the mapping to an APN to be used by the UE when connected to the EPC (that is, when the UE establishes a PDN connection while connected to the EPC either with the 3GPP access connected to the EPC or via non-3GPP access (e.g. via untrusted non-3GPP and an ePDG)), if the APN used in the EPC is different from the DNN used in the 5GC. In this way, a single mapping of applications and connectivity may exist in the UE.

In some examples, when the UE first establishes PDU sessions via the 5GC and then moves the PDU sessions to the EPC, for the PDU sessions that are moved to the EPC (a selective set in case of dual-registration UE, or the set of PDU sessions that are supported in EPC after the mobility to EPC), the UE may maintain for each PDN connection the mapping between the <DNN, S-NSSAI> and the PDU Session ID that would apply for this PDU session in the 5GC, and to the APN corresponding to the PDN connection in the EPC. This may be particularly important for PDN connections established while the UE is connected to the EPC.

In some examples, when the UE moves from the EPC to the 5GC (e.g., for single registration UE this applies to idle mode mobility and to MME-AMF interface handover; for dual-radio UE this applies to the registration performed in the 5GC when the UE is connected to the EPC, either ahead of the UE moving the PDN connections, or when the UE triggers the mobility of the first PDN connection to the 5GS), the UE may provide the mapping of S-NSSAIs to PDU session IDs, and possibly the mapping of PDU session IDs to the related DNN, to the 5GC in NAS mobility management messages (e.g. Registration Request) in addition to the Requested NSSAI. This may enable the AMF receiving such information to identify which Network Slices correspond to the PDN connections that were active for the UE in the EPC.

In another aspect, (2) as an alternative to (1) above, when the UE moves from the 5GC to the EPC, the UE may provide to the MME in NAS MM procedures (e.g. TAU) a "Slicing Information Container" that may contain a mapping between the PDU sessions and the corresponding slices (that is, mapping of PDU Session ID to S-NSSAI). The MME may not interpret such information but may store it. In some examples, the UE may update the information in the MME each time a PDN connection is added or dropped (including if the handover of PDU sessions from the 5GC to the EPC results in some PDU sessions being dropped). In some examples, in case of handover from the EPC to the 5GC, or when the AMF retrieves the context from the MME in idle mode mobility, the MME may provide the stored container to the AMF. The AMF may use the information in the container to map the PDU sessions to the appropriate slices (i.e. S-NSSAI).

In another aspect, (3) in addition to the previous solutions, for scenarios where a single-registration UE connects first to the 5GC, then moves to the EPC, and returns to the 5GC, instead of providing in RRC signaling the 5G GUTI previously allocated by the AMF, the UE may provide only the Requested NSSAI based on the set of slices required by the UE, in order to enable the RAN to select an AMF that can serve the set of slices to which the UE connects to. The UE may provide however the 5G GUTI in NAS signaling.

In yet another aspect, (4) a UE that has registered with an AMF indicating the ability to connect to the EPC, when an SMF is selected during PDU session creation (e.g. by the AMF or NSSF or NRF), the entity selecting the SMF may consider the mapping between the S-NSSAIs and DCNs in the SMF selection. The consideration of the mapping may be done to enable the selection of an SMF/PGW-C that is in the correct DCN, in order to support mobility to the EPC. For example, if S-NSSAI1 would map to DCN1 and S-NSSAI2 would map to DCN2, when an SMF is selected for a PDU session corresponding to S-NSSAI1, an SMF/PGW combo for S-NSSAI1 that belongs to DCN1 may need to be selected.

In yet another aspect, (5) when an MME receives an attach or TAU from a UE that is previously registered with a core network node (e.g., AMF) identified by the UE temporary identifier provided by the UE (e.g. the mapped GUTI a single-registration UE provides to the MME, creating it from the 5G GUTI the UE obtained in the 5GC from an AMF), the MME may retrieve the MM/SM context from the source core network node (e.g. the AMF) and may determine, based on the received MM/SM context, whether the MME can serve the UE or whether redirection to an MME in another DCN is required. The MME may perform the determination based on the content of the MM/SM context. To enable this, the AMF may receive from the HSS/UDM both the 5G and the EPC subscription information, and mapping information between the DNN used in the 5G system and the APNs to be used in the EPC. The AMF, when providing the SM context to the MME, may provide the PDU session IDs of PDU sessions and the APN that corresponds to the DNN of the PDU session.

In yet another aspect, (6) an alternative to (5), for each subscriber of a network deploying both EPC and 5GC, the common HSS/UDM node may store a UE Usage Type. The HSS may also store a Current UE Usage Type value, which is set by an AMF.

In some examples, the AMF may be configured with mapping information to map combinations of S-NSSAIs to Usage Type values.

In some examples, when the AMF allocates an Allowed NSSAI to the UE, the AMF may also send the mapped UE Usage Type to the HSS, and the HSS may store the mapped UE Usage Type as the Current UE Usage Type.

In some examples, when an MME retrieves from the UE the UE Usage Type, if the HSS has a stored Current UE Usage Type, the HSS may provide to the UE the Current UE Usage Type. This may help an MME to determine if the MME can serve a UE when a UE performs an attach or TAU procedure with the MME after having established a context with the AMF. In this way, the MME can select a serving MME corresponding to the DCN that supports the slices that the UE is connected to over the 5GC.

In some examples, optionally, when the HSS receives a new value of the Temporary UE Usage Type and determines that the UE has a registration to the 5GC and a registration to the EPC, the HSS may trigger a UE Usage Type update to the MME. Upon receiving such update, the MME may store the received UE Usage Type and may remember that the UE Usage Type was modified. Upon the UE performing signalling towards the MME, the MME may determine whether the MME can serve the UE based on the received UE usage type and, if not, the MME triggers an MME re-allocation to a new serving MME.

Referring to FIG. 3, there is shown a flow diagram of an example of a method 300 according to the above-described aspects for interworking between 5GS network slicing and EPC connectivity, the method 300 including one or more of the herein-defined actions.

For example, at 302, the method 300 may include enabling NSSPs to map applications to network slices, to a DNN, and to an APN to be used when a UE is in the EPC. As an example, when the APN used in the EPC is different from the DNN used in the 5GS. For instance, in an aspect, one or more of the devices described herein may execute the actions in 302.

At 304, the method 300 includes mapping the applications. For instance, in an aspect, one or more of the devices described herein may execute the actions in 304.

At 306, the method 300 optionally includes maintaining a mapping of the network slices, the DNN, and the APN to a packet data unit (PDU) session identity (ID) for each active PDU session. For instance, in an aspect, one or more of the devices described herein may execute the actions in 306.

Referring to FIG. 4, there is shown is a flow diagram of an example of a method 400 according to the above-described aspects for interworking between 5GS network slicing and EPC connectivity, the method 400 including one or more of the herein-defined actions.

For example, at 402, the method 400 includes enabling UE functionality to maintain a mapping between active PDN connections and a corresponding S-NSSAI in response to the UE moving to an EPC or in response to new PDN connections are created while the UE is in the EPC. For instance, in an aspect, one or more of the devices described herein may execute the actions in 402. As used herein, the terms PDN connection and PDU session are equivalent and can be used interchangeably.

At 404, the method 400 includes providing information about the mapping to an AMF during a registration procedure. For instance, in an aspect, one or more of the devices described herein may execute the actions in 404.

Figure 5:
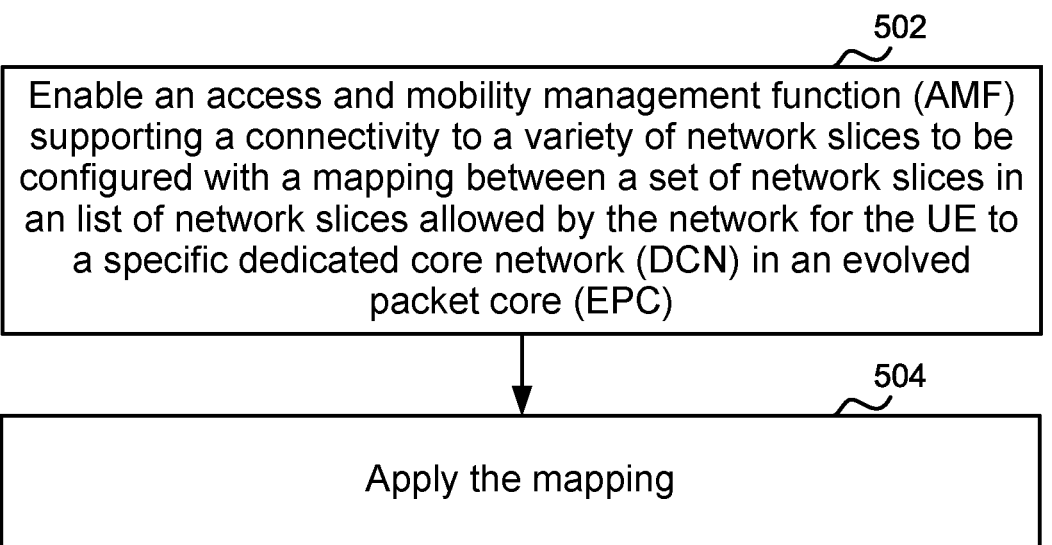
FIG. 5 is a flow diagram of an example of another method for interworking between 5GS network slicing and EPC connectivity.

Referring to FIG. 5, there is shown is a flow diagram of an example of a method 500 according to the above-described aspects for interworking between 5GS network slicing and EPC connectivity, the method 500 including one or more of the herein-defined actions.

For example, at 502, the method 500 includes enabling an AMF supporting a connectivity to a variety of network slices to be configured with a mapping between a set of network slices (e.g., each can be identified by an S-NSSAIs) in a list of network slices allowed by the network for the UE (that is, in an allowed S-NSSAI assigned to a UE) to a specific DCN in an EPC. For instance, in an aspect, one or more of the devices described herein may execute the actions in 502. As described herein, a network slice is a slice identified by S-NSSAI, an allowed network slice is a slice identified by allowed NSSAI, and similarly for other network slices.

At 504, the method 500 includes applying the mapping. For instance, in an aspect, one or more of the devices described herein may execute the actions in 504.

Referring to FIG. 6, there is shown is a flow diagram of an example of a method 600 according to the above-described aspects for interworking between 5GS network slicing and EPC connectivity, the method 600 including one or more of the herein-defined actions.

For example, at 602, the method 600 includes enabling an SMF-selection functionality to ensure that an AMF selects an SMF for establishing a PDU session for a UC corresponding to a network slice (e.g., identified by S-NSSAI) considering a mapping between a set of network slices (e.g., identified by an S-NSSAIs) and DCNs in the EPC, in order to ensure the SMF may continue supporting the connectivity management for the PDU session when the UE moves the PDU session to the EPC and a specific DCN is select to serve the UE based on the mapping between the network slices and the DCNs. For instance, in an aspect, one or more of the devices described herein may execute the actions in 602.

At 604, the method 600 includes applying the SMF-selection functionality. For instance, in an aspect, one or more of the devices described herein may execute the actions in 604.

Referring to FIG. 7, there is shown is a flow diagram of an example of a method 700 according to the above-described aspects for interworking between 5GS network slicing and EPC connectivity, the method 700 including one or more of the herein-defined actions.

For example, at 702, the method 700 includes augmenting a subscribed UE usage type maintained in an HSS with a temporary UE usage type set by an AMF based on an allowed S-NSSAI. For instance, in an aspect, one or more of the devices described herein may execute the actions in 702.

At 704, the method 700 includes providing the temporary UE usage type to the HSS when the allowed S-NSSAI is allocated to the UE. For instance, in an aspect, one or more of the devices described herein may execute the actions in 704.

At 706, the method 700 optionally includes storing, in the HSS, the temporary UE usage type in addition to the subscribed UE usage type.

At 708, the method 700 optionally includes when providing the UE usages type to an MME, if the HSS has a stored temporary UE usage type, the HSS provided the temporary UE usage type.

Figure 8:
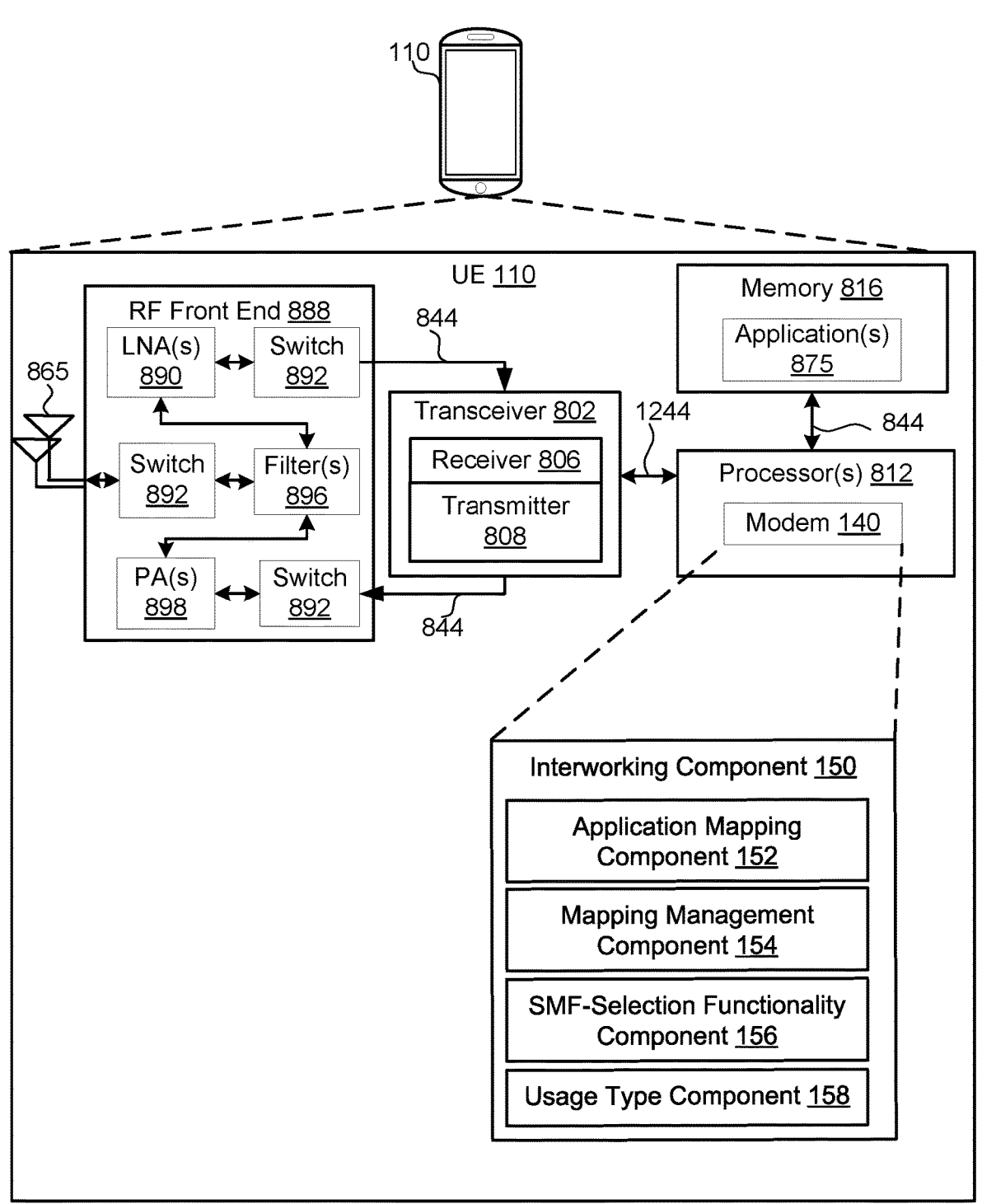
FIG. 8 is a schematic diagram of example components of the UE of FIG. 1.

Referring to FIG. 8, one example of an implementation of UE 110 may include a variety of components, some of which have already been described above, but including components such as one or more processors 812 and memory 816 and transceiver 802 in communication via one or more buses 844, which may operate in conjunction with modem 140 and the interworking component 150 to enable one or more of the functions described herein related to mechanisms that enable interworking between 5GS network slicing and EPC connectivity. Further, the one or more processors 812, modem 140, memory 816, transceiver 802, RF front end 888 and one or more antennas 865, may be configured to support voice and/or data calls (simultaneously or non-simultaneously) in one or more radio access technologies.

In an aspect, the one or more processors 812 can include the modem 140 that uses one or more modem processors. The various functions related to interworking component 150 may be included in modem 140 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 140 associated with interworking component 150 may be performed by transceiver 802.

Also, memory 816 may be configured to store data used herein and/or local versions of applications 875 or interworking component 150 and/or one or more of its subcomponents being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining interworking component 150 and/or one or more of its subcomponents, and/or data associated therewith, when UE 110 is operating at least one processor 812 to execute interworking component 150 and/or one or more of its subcomponents. The interworking component 150 may include one or more subcomponents configured to perform at least some of the actions described above in connection with methods 300, 400, 500, 600, and/or 700.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 125. Additionally, receiver 806 may process such received signals, and also may obtain measurements of the signals, such as, but not limited to, Ec/, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 808 may including, but is not limited to, an RF transmitter.

Moreover, in an aspect, UE 110 may include RF front end 888, which may operate in communication with one or more antennas 865 and transceiver 802 for receiving and transmitting radio transmissions, for example, wireless communications transmitted by at least one base station 125 or wireless transmissions transmitted by UE 110. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that UE 110 can communicate with, for example, one or more base stations 125 or one or more cells associated with one or more base stations 125. In an aspect, for example, modem 140 can configure transceiver 802 to operate at a specified frequency and power level based on the UE configuration of the UE 110 and the communication protocol used by modem 140.

In an aspect, modem 140 can be a multiband-multimode modem, which can process digital data and communicate with transceiver 802 such that the digital data is sent and received using transceiver 802. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 9:
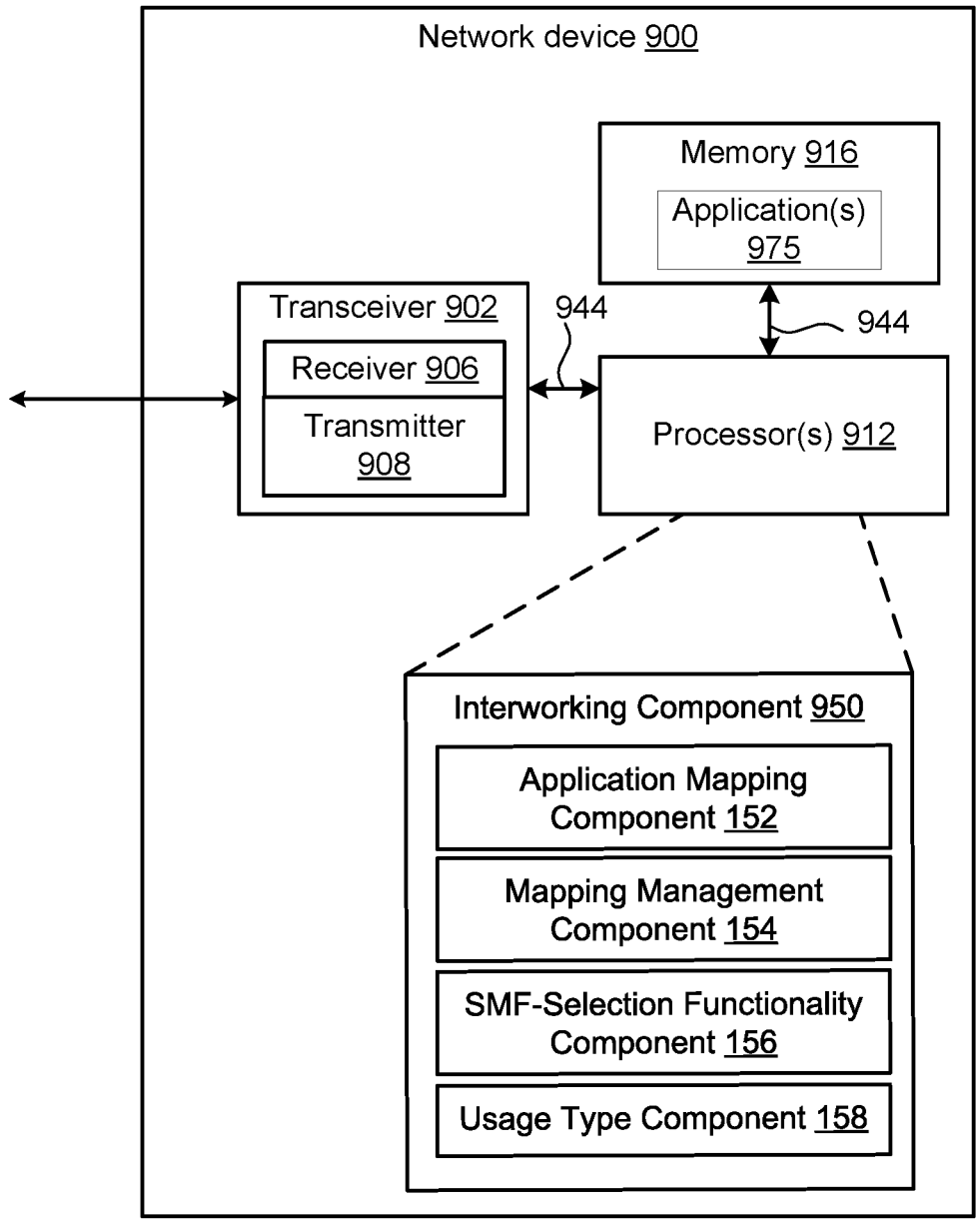
FIG. 9 is a schematic diagram of example components of a networking device to enable interworking between 5GS network slicing and EPC connectivity.

Referring to FIG. 9, one example of an implementation of a network device 900 may include a variety of components, some of which have already been described above, but including components such as one or more processors 912 and memory 916 and transceiver 902 in communication via one or more buses 944, which may operate in conjunction with an interworking component 950 to enable one or more of the functions described herein related to network-side operations associated with mechanisms that enable interworking between 5GS network slicing and EPC connectivity. In an example, the network device 900 can implement at least some of the functionality of an AMF or an MME (see FIG. 2), where such functionality is related to network-side operations associated with mechanisms that enable interworking between 5GS network slicing and EPC connectivity The transceiver 902, receiver 906, transmitter 908, one or more processors 912, memory 916, applications 975, and buses 944 may be the same as or similar to the corresponding components of UE 110, as described above, but configured or otherwise programmed for network-side operations as opposed to UE operations. The transceiver 902 may be configured to support an interface such as, for example, the MME-AMF interface described above in connection with FIG. 2.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications, comprising:

enabling user equipment (UE) functionality to maintain a mapping between active packet data network (PDN) connections and corresponding single network slice selection assistance information (S-NSSAI) in response to a UE moving to an evolved packet core (EPC) or in response to new PDN connections being created while the UE is in the EPC;

providing information about the mapping to an access and mobility management function (AMF) during a registration procedure; and receiving the corresponding S-NSSAI in a Protocol Configuration Option (PCO) field in response to the new PDN connection being created while the UE is in the EPC.

2. The method of claim 1, wherein a PDN connection is the same or similar to a packet data unit (PDU) session.

3. A wireless communication device, comprising:

memory storing instructions; and a processor in communication with the memory, wherein the processor is configured to execute the instructions to:

enable user equipment (UE) functionality to maintain a mapping between active packet data network (PDN) connections and corresponding single network slice selection assistance information (S-NSSAI) in response to a UE moving to an evolved packet core (EPC) or in response to new PDN connections being created while the UE is in the EPC;

provide information about the mapping to an access and mobility management function (AMF) during a registration procedure; and receive the corresponding S-NSSAI in a Protocol Configuration Option (PCO) field in response to the new PDN connection being created while the wireless communication device is in the EPC.

4. The wireless communication device of claim 3, wherein a PDN connection is the same or similar to a packet data unit (PDU) session.

* * * * *